(12) United States Patent
Yagi et al.

(10) Patent No.: US 10,864,710 B2
(45) Date of Patent: Dec. 15, 2020

(54) FILM

(71) Applicant: Asahi Kasei Kabushiki Kaisha, Tokyo (JP)

(72) Inventors: Noriko Yagi, Tokyo (JP); Yasuhiro Kusanose, Tokyo (JP); Hiroyuki Ichino, Tokyo (JP); Masahiro Fujiwara, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 306 days.

(21) Appl. No.: 15/758,374

(22) PCT Filed: Sep. 7, 2016

(86) PCT No.: PCT/JP2016/076351
§ 371 (c)(1),
(2) Date: Mar. 8, 2018

(87) PCT Pub. No.: WO2017/043549
PCT Pub. Date: Mar. 16, 2017

(65) Prior Publication Data
US 2018/0244025 A1    Aug. 30, 2018

(30) Foreign Application Priority Data
Sep. 9, 2015  (JP) .................................. 2015-177932

(51) Int. Cl.
| | |
|---|---|
| *B32B 27/32* | (2006.01) |
| *C08F 293/00* | (2006.01) |
| *B32B 27/08* | (2006.01) |
| *B32B 27/30* | (2006.01) |
| *B32B 27/20* | (2006.01) |
| *B32B 25/16* | (2006.01) |
| *B32B 27/26* | (2006.01) |
| *B32B 27/18* | (2006.01) |
| *B29K 23/00* | (2006.01) |
| *B29K 67/00* | (2006.01) |

(52) U.S. Cl.
CPC .............. *B32B 27/32* (2013.01); *B32B 25/16* (2013.01); *B32B 27/08* (2013.01); *B32B 27/18* (2013.01); *B32B 27/20* (2013.01); *B32B 27/26* (2013.01); *B32B 27/302* (2013.01); *C08F 293/00* (2013.01); *B29K 2023/12* (2013.01); *B29K 2067/00* (2013.01); *B32B 2250/03* (2013.01); *B32B 2250/24* (2013.01); *B32B 2250/40* (2013.01); *B32B 2264/025* (2013.01); *B32B 2270/00* (2013.01); *B32B 2307/31* (2013.01); *B32B 2307/412* (2013.01); *B32B 2307/54* (2013.01); *B32B 2307/558* (2013.01); *B32B 2307/7246* (2013.01); *B32B 2405/00* (2013.01); *B32B 2439/46* (2013.01); *B32B 2439/70* (2013.01); *B32B 2439/80* (2013.01); *B32B 2457/00* (2013.01); *B32B 2479/00* (2013.01); *B32B 2605/08* (2013.01)

(58) Field of Classification Search
CPC ......... B32B 27/32; B32B 27/08; B32B 27/00; B32B 2250/03; B32B 27/302; C08J 2453/02; B29C 48/08
See application file for complete search history.

(56) References Cited

U.S. PATENT DOCUMENTS

| | | |
|---|---|---|
| 2009/0246518 A1 | 10/2009 | Fujimura et al. |
| 2010/0243159 A1 | 9/2010 | Nishio et al. |
| 2011/0319837 A1 | 12/2011 | Uehara et al. |
| 2013/0011614 A1 | 1/2013 | Nagae et al. |
| 2013/0209787 A1 | 8/2013 | Eguchi et al. |
| 2014/0004288 A1 | 1/2014 | Wakayama et al. |
| 2014/0357798 A1 | 12/2014 | Shimizu et al. |

FOREIGN PATENT DOCUMENTS

| | | | |
|---|---|---|---|
| CN | 104275892 A | | 1/2015 |
| JP | H06-070971 A | | 3/1994 |
| JP | H07-118335 A | | 5/1995 |
| JP | H07-227938 A | | 8/1995 |
| JP | H09-254339 A | | 9/1997 |
| JP | 09327893 | * | 12/1997 |
| JP | H09-327893 A | | 12/1997 |
| JP | H11-320765 A | | 11/1999 |
| JP | 2000-093490 A | | 4/2000 |
| JP | 2001-150600 A | | 6/2001 |
| JP | 2001-240636 A | | 9/2001 |
| JP | 2001-329074 A | | 11/2001 |
| JP | 2003-205033 A | | 7/2003 |
| JP | 2003-246021 A | | 9/2003 |
| JP | 2005-125706 A | | 5/2005 |
| JP | 2006-001092 A | | 1/2006 |
| JP | 3867366 | * | 10/2006 |
| JP | 2009-191187 A | | 8/2009 |
| JP | 2010-053319 A | | 3/2010 |
| KR | 20100092023 A | | 8/2010 |
| KR | 2014-0044930 A | | 4/2014 |
| WO | 2010/087440 A1 | | 8/2010 |
| WO | 2010/104068 A1 | | 9/2010 |

OTHER PUBLICATIONS

International Preliminary Report on Patentability and Written Opinion issued in corresponding International Patent Application No. PCT/JP2016/076351 dated Mar. 22, 2018.
Supplementary European Search Report issued in counterpart European Patent Application No. 16844410.7 dated Jun. 19, 2018.
International Search Report issued in corresponding International Patent Application No. PCT/JP2016/076351 dated Dec. 13, 2016.

* cited by examiner

*Primary Examiner* — Gregory Listvoyb
(74) *Attorney, Agent, or Firm* — Morgan, Lewis & Bockius LLP

(57) ABSTRACT

The disclosure provides a film wherein an outer layer includes a polypropylene resin, an intermediate layer includes a polypropylene resin and a hydrogenated block copolymer (a), and an inner layer includes a polypropylene resin.

11 Claims, No Drawings

FILM

TECHNICAL FIELD

The present invention relates to films.

BACKGROUND ART

Polypropylene resins, which generally have excellent chemical resistance and mechanical properties, are used in wide range of fields, for example, packaging materials, machine parts, and automotive parts.

By necessity from the viewpoint of environmental issues, development of non-halogen transparent polymer materials has proceeded recently. Particularly in the field of films, polypropylene resins are used, and there arises a need for softening or transparentizing polypropylene resins in accordance with applications.

The following Patent Literature 1 discloses a soft molded article for medical use including (i) polypropylene, (ii) a hydrogenated diene polymer which is a block copolymer including a polybutadiene block segment (A) having a 1,4-bond content of 70% or more and a block segment (B) which is a conjugated diene compound or a random copolymer of a vinyl aromatic compound containing 70% by weight of a conjugated diene compound and the conjugated diene compound and in which the vinyl bond content in the conjugated diene compound portion is 60% or more, wherein at least 80% of the double bonds of the conjugated diene portion are saturated, and (iii) 0 to 98% by weight of an olefin based polymer mainly comprising ethylene[provided that (i)+(ii)+(iii)=100% by weight].

Patent Literature 2 discloses a multi-layered laminate including a base layer (I) and a surface layer (II) provided on at least one face of the base layer (I), wherein the base layer (I) is constituted by the following (i)/(ii)=100 to 20/0 to 80% by weight and the surface layer (II) is constituted by the following (i)/(iii)=95 to 50/5 to 50% by weight ((i) a polyolefin resin, (ii) a hydrogenated diene copolymer in which 80% or more of the double bonds of the conjugated diene portion of the conjugated diene polymer are saturated and of which number average molecule weight is 50,000 to 700,000, and (iii) a hydrogenated diene copolymer having a block of a hydrogenated butadiene copolymer which contains 25% or less of butadiene having 1,2-vinyl bonds at terminals, at least one terminal).

CITATION LIST

Patent Literature

Patent Literature 1: Japanese Unexamined Patent Application Publication No. 2000-93490
Patent Literature 2: Japanese Unexamined Patent Application Publication No. 9-327893

SUMMARY OF INVENTION

Technical Problem

Molded articles of polypropylene resin composition used in the food packaging field, apparel packaging field, and medical field are required to have transparency and flexibility, and are additionally required to have a satisfactory balance between these properties.

Both the molded article described in Patent Literature 1 and the multi-layered laminate as disclosed in Patent Literature 2, however, remain for the improvement in transparency and flexibility.

In consideration of the problem involved in the conventional techniques, it is an object of the present invention to provide a film having excellent transparency and flexibility and an excellent balance between these properties.

Solution to Problem

The present inventors have made extensive investigations to solve the aforementioned problems and, as a result, have found that the problem can be solved by a film containing a hydrogenated block copolymer (a) having a specific structure, having completed the present invention.

That is, the present invention is as follows.

[1]

A film comprising at least an outer layer, an intermediate layer, and an inner layer, wherein the outer layer comprises a polypropylene resin, the intermediate layer comprises a polypropylene resin and a hydrogenated block copolymer (a), and the inner layer comprises a polypropylene resin, and wherein the hydrogenated block copolymer (a) comprises, in a molecule, a polymer block mainly comprising a conjugated diene compound (C), a polymer block mainly comprising a conjugated diene compound (B), and a polymer block mainly comprising a vinyl aromatic compound (S), a content of the polymer block mainly comprising a conjugated diene compound (C) is 1 to 30% by mass, a content of the polymer block mainly comprising a conjugated diene compound (B) is 69 to 98% by mass, and a content of the polymer block mainly comprising a vinyl aromatic compound (S) is 1 to 20% by mass in the hydrogenated block copolymer (a), and the polymer block mainly comprising a conjugated diene compound (C) has a vinyl bond content before hydrogenation of 1 to 25 mol %, the polymer block mainly comprising a conjugated diene compound (B) has a vinyl bond content before hydrogenation of 60 to 100 mol %, and the hydrogenated block copolymer (a) has a degree of hydrogenation of 80 mol % or more.

[2]

The film according to [1], wherein the content of the polymer block mainly comprising a conjugated diene compound (C) is 3 to 13% by mass, the content of the polymer block mainly comprising a conjugated diene compound (B) is 74 to 96% by mass, and the content of the polymer block mainly comprising a vinyl aromatic compound (S) is 3 to 13% by mass in the hydrogenated block copolymer (a), the total content of the polymer block mainly comprising a conjugated diene compound (C) and the polymer block mainly comprising a vinyl aromatic compound (S) is 6 to 26% by mass, and the hydrogenated block copolymer (a) has a degree of hydrogenation of 90 mol % or more.

[3]
A film comprising at least an outer layer, an intermediate layer, and an inner layer, wherein
the outer layer comprises a polypropylene resin,
the intermediate layer comprises a polypropylene resin and a hydrogenated block copolymer (a), and
the inner layer comprises a polypropylene resin, and wherein
a content of the vinyl aromatic compound monomer unit in the hydrogenated block copolymer (a) is 3 to 13% by mass,
the hydrogenated block copolymer (a) has a degree of hydrogenation of 90 mol %,
an amount of butylene and/or amount of propylene in the hydrogenated block copolymer (a) is 60 to 85 mol % based on 100 mol % of the conjugated diene compound unit in total,
the hydrogenated block copolymer (a) has a crystallization peak at 0 to 60° C.,
the hydrogenated block copolymer (a) has a heat quantity of crystallization of 1.0 to 8.0 J/g, and
the hydrogenated block copolymer (a) has a Shore A hardness of 25 to 55.

[4]
The film according to any of [1] to [3], wherein the outer layer has a thickness of 5 to 50 μm, the intermediate layer has a thickness of 100 to 200 μm, and the inner layer has a thickness of 5 to 50 μm.

[5]
The film according to any of [1] to [4], wherein
the outer layer comprises the hydrogenated block copolymer (a) and/or a hydrogenated block copolymer (b1) (provided that the block copolymer (b1) does not comprise the polymer block mainly comprising a conjugated diene compound (C)),
the hydrogenated block copolymer (b1) comprises a polymer block mainly comprising a conjugated diene compound (B1) and a polymer block mainly comprising a vinyl aromatic compound (S1),
a content of the polymer block mainly comprising a conjugated diene compound (B1) is 75 to 92% by mass, and a content of the polymer block mainly comprising a vinyl aromatic compound (S1) is 8 to 25% by mass in the hydrogenated block copolymer (b1),
a vinyl bond content before hydrogenation of the polymer block mainly comprising a conjugated diene compound (B1) is 40 to 100 mol %, and the hydrogenated block copolymer (b1) has a degree of hydrogenation of 80 mol % or more,
a content of the polypropylene resin in the outer layer is 60 to 100% by mass, and
a content of the hydrogenated block copolymer (a) and/or hydrogenated block copolymer (b1) in the outer layer is 0 to 40% by mass.

[6]
The film according to any of [1] to [4], wherein
the inner layer comprises the hydrogenated block copolymer (a) and/or the hydrogenated block copolymer (b1) (provided that the block copolymer (b1) does not comprise the polymer block mainly comprising a conjugated diene compound (C)),
the hydrogenated block copolymer (b1) comprises a polymer block mainly comprising a conjugated diene compound (B1) and a polymer block mainly comprising a vinyl aromatic compound (S1),
a content of the polymer block mainly comprising a conjugated diene compound (B1) is 75 to 92% by mass and a content of the polymer block mainly comprising a vinyl aromatic compound (S1) is 8 to 25% by mass in the hydrogenated block copolymer (b1),
a vinyl bond content before hydrogenation of the polymer block mainly comprising a conjugated diene compound (B1) is 40 to 100 mol %, and the hydrogenated block copolymer (b1) has a degree of hydrogenation of 80 mol % or more,
a content of the polypropylene resin in the inner layer is 50 to 95% by mass, and
a content of the hydrogenated block copolymer (a) and/or hydrogenated block copolymer (b1) in the inner layer is 5 to 50% by mass.

[7]
The film according to any of [1] to [6], wherein the hydrogenated block copolymer (a) comprises two or more of the polymer blocks mainly comprising a conjugated diene compound (B) in a molecule, and a content of a polymer block (B-1) present at a terminal of the hydrogenated block copolymer (a) of the polymer blocks mainly comprising a conjugated diene compound (B) is 1 to 10% by mass in the hydrogenated block copolymer (a).

[8]
The film according to any of [1] to [7], wherein
the outer layer further comprises a hydrogenated block copolymer (b2),
the hydrogenated block copolymer (b2) comprises a polymer block mainly comprising a conjugated diene compound (B2) and a polymer block mainly comprising a vinyl aromatic compound (S2),
a content of the polymer block mainly comprising a conjugated diene compound (B2) is 75 to 92% by mass and a content of the polymer block mainly comprising a vinyl aromatic compound (S2) is 8 to 25% by mass in the hydrogenated block copolymer (b2),
a vinyl bond content before hydrogenation of the polymer block mainly comprising a conjugated diene compound (B2) is 62 to 100 mol %, and the hydrogenated block copolymer (b2) has a degree of hydrogenation of 80 mol % or more, and
the hydrogenated block copolymer (b2) comprises
two or more of the polymer blocks mainly comprising a conjugated diene compound (B2) in a molecule, and a content of a polymer block (B-2) present at a terminal of the hydrogenated block copolymer (b2) of the polymer block mainly comprising a conjugated diene compound (B2) is 1 to 10% by mass in the hydrogenated block copolymer.

[9]
The film according to any of [1] to [8], wherein
the inner layer further comprises a hydrogenated block copolymer (b2),
the hydrogenated block copolymer (b2) comprises a polymer block mainly comprising a conjugated diene compound (B2) and a polymer block mainly comprising a vinyl aromatic compound (S2),
a content of the polymer block mainly comprising a conjugated diene compound (B2) is 75 to 92% by mass, and a content of the polymer block mainly comprising a vinyl aromatic compound (S2) is 8 to 25% by mass in the hydrogenated block copolymer (b2),
a vinyl bond content before hydrogenation of the polymer block mainly comprising a conjugated diene compound (B2) is 62 to 100 mol %, and the hydrogenated block copolymer (b2) has a degree of hydrogenation of 80 mol % or more, and
the hydrogenated block copolymer (b2) comprises two or more of the polymer blocks mainly comprising a conjugated diene compound (B2) in a molecule, and a content of a polymer block (B-2) present at a terminal of the hydrogenated block copolymer (b2) of the polymer block mainly comprising a conjugated diene compound (B2) is 1 to 10% by mass in the hydrogenated block copolymer.

[10]

The film according to any of [1] to [9], wherein the hydrogenated block copolymer (a) has a weight average molecular weight (Mw) of 100,000 to 300,000.

[11]

The film according to any of [1] to [10], wherein the hydrogenated block copolymer (a) has a weight average molecular weight (Mw) of 100,000 to 300,000, and a ratio of a weight average molecular weight (Mw) to a number average molecule weight (Mn) of the hydrogenated block copolymer (a), (Mw)/(Mn), is 1.01 to 1.30.

[12]

The film according to any of [1] to [11], wherein an integrated amount of elution at −20° C. or less measured by cross-fractionation chromatography (CFC) is 0.1% or more and less than 40% based on the total integrated amount of elution, an integrated amount of elution in the range of more than −20° C. and less than 60° C. is 20% or more and less than 95% based on the total integrated amount of elution, and an integrated amount of elution in the range of 60° C. or more and 150° C. or less is 5% or more and less than 70% based on the total integrated amount of elution.

[13]

The film according to any of [1] to [12], wherein the molecular weight distribution (Mw/Mn) of an eluted component in the range of 10° C. or more and less than 60° C. measured by cross-fractionation chromatography (CFC) is 1.05 or more and 1.50 or less.

Advantageous Effects of Invention

According to the present invention, there can be provided a film having excellent transparency and flexibility and an excellent balance between these properties.

DESCRIPTION OF EMBODIMENTS

Embodiments for carrying out the present invention (hereinbelow, simply referred to as "the present embodiment") will be mentioned below in detail. The following embodiments are provided for illustrating the present invention and are not intended to limit the present invention to the contents below. The present invention can be properly modified and implemented without departing from the gist.

[Film]

The film of the present embodiment comprises at least an outer layer, an intermediate layer, and an inner layer.

The "outer layer" and "inner layer" herein are surface layers layered on either surface of the "intermediate layer". The "outer layer" refers to a layer located outermost when put into actual use.

The outer layer contains a polypropylene resin.

The intermediate layer contains a polypropylene resin and a hydrogenated block copolymer (a).

The inner layer contains a polypropylene resin.

Having the above configuration, a film can be provided having excellent transparency and flexibility.

(Hydrogenated Block Copolymer (a))

The hydrogenated block copolymer (a) comprises, in a molecule, a polymer block mainly comprising a conjugated diene compound (C), a polymer block mainly comprising a conjugated diene compound (B), and a polymer block mainly comprising a vinyl aromatic compound (S).

In the hydrogenated block copolymer (a), a content of the polymer block mainly comprising a conjugated diene compound (C) is 1 to 30% by mass, a content of the polymer block mainly comprising a conjugated diene compound (B) is 69 to 98% by mass, and a content of the polymer block mainly comprising a vinyl aromatic compound (S) is 1 to 20% by mass, the polymer block mainly comprising a conjugated diene compound (C) has a vinyl bond content before hydrogenation of 1 to 25 mol %, the polymer block mainly comprising a conjugated diene compound (B) has a vinyl bond content before hydrogenation of 60 to 100 mol %, and the hydrogenated block copolymer has a degree of hydrogenation of 80 mol % or more.

Herein, "mainly comprising" means that 50% by mass or more of an intended monomer unit is contained in an intended polymer block.

From the viewpoint of the flexibility of the film of the present embodiment, the content of the conjugated diene compound in the polymer block mainly comprising a conjugated diene compound (C) and the content of the conjugated diene compound in the polymer block mainly comprising a conjugated diene compound (B) are, each independently, preferably 60% by mass or more, more preferably 70% by mass or more, still more preferably 80% by mass or more, even more preferably 90% by mass or more.

From the viewpoint of the mechanical strength and impact resistance of the film of the present embodiment, the content of the vinyl aromatic compound in the polymer block mainly comprising a vinyl aromatic compound (S) is preferably 60% by mass or more, more preferably 70% by mass or more, still more preferably 80% by mass or more, even more preferably 90% by mass or more.

In the present embodiment, the nomenclature of each monomer unit constituting the block copolymers complies with the nomenclature of the monomer from with the monomer unit is derived.

For example, a "vinyl aromatic compound monomer unit" means a constituent unit of a polymer which results from polymerization of a vinyl aromatic compound, which is a monomer. The structure of the unit is a molecular structure in which two carbon atoms of a substituted ethylene group derived from a substituted vinyl group serve as bonding sites.

A "conjugated diene compound monomer unit" means a constituent unit of a polymer which results from polymerization of a conjugated diene compound, which is a monomer. The structure of the unit is a molecular structure in which two carbon atoms of an olefin derived from the conjugated diene compound monomer serve as bonding sites.

The "vinyl bond content before hydrogenation" in the polymer block mainly comprising a conjugated diene compound (C) or (B) refers to a content of 1,2-bond (the total content of 1,2-bond and 3,4-bond when incorporated in the polymer with a 3,4-bond) (mol %) based on the total content of 1,4-bond (cis or trans) and 1,2-bond (the total content of 1,2-bond and 3,4-bond when incorporated in the polymer with a 3,4-bond) derived from a conjugated diene compound incorporated in the polymer before hydrogenation.

The vinyl bond content can be measured by nuclear magnetic resonance spectral analysis (NMR).

The content of the polymer block mainly comprising a conjugated diene compound (C) in the hydrogenated block copolymer (a) is 1 to 30% by mass.

The content of the polymer block mainly comprising a conjugated diene compound (C) in the hydrogenated block copolymer (a) is preferably 2 to 20% by mass, more preferably 2 to 15% by mass, still more preferably 3 to 13% by mass, from the viewpoint of transparency, flexibility, and the like of the film of the present embodiment.

The vinyl bond content before hydrogenation of the polymer block mainly comprising a conjugated diene compound (C) is 1 to 25 mol %.

The vinyl bond content before hydrogenation of the polymer block mainly comprising a conjugated diene compound (C) is preferably 3 to 23 mol %, more preferably 5 to 20 mol %, from the viewpoint of the water vapor barrier property of the film of the present embodiment.

The vinyl bond content before hydrogenation of the polymer block mainly comprising a conjugated diene compound (C) can be measured by the method described in examples mentioned below.

The vinyl bond content can be controlled by use of a vinylating agent such as polar compounds, Lewis bases, ethers, and amines.

The content of the polymer block mainly comprising a conjugated diene compound (B) in the hydrogenated block copolymer (a) is 69 to 98% by mass.

The content of the polymer block mainly comprising a conjugated diene compound (B) is preferably 70 to 97% by mass, more preferably 73 to 96% by mass, still more preferably 74 to 96% by mass, from the viewpoint of the transparency and flexibility of the film of the present embodiment.

The vinyl bond content before hydrogenation of the polymer block mainly comprising a conjugated diene compound (B) is 60 to 100 mol %.

The vinyl bond content before hydrogenation of the polymer block mainly comprising a conjugated diene compound (B) is preferably 63 to 98 mol %, more preferably 65 to 95 mol %, from the viewpoint of the transparency and flexibility of the film of the present embodiment.

The vinyl bond content before hydrogenation of the polymer block mainly comprising a conjugated diene compound (B) can be measured by the method described in examples mentioned below.

The vinyl bond content can be controlled by use of a vinylating agent such as polar compounds, Lewis bases, ethers, and amines.

The conjugated diene compound used in the polymer blocks (C) and (B) in the hydrogenated block copolymer (a) in the film of the present embodiment is a diolefin having a pair of conjugated double bonds.

Examples of the diolefin include, but not limited to, 1,3-butadiene, 2-methyl-1,3-butadiene (isoprene), 2,3-dimethyl-1,3-butadiene, 1,3-pentadiene, 2-methyl-1,3-pentadiene, 1,3-hexadiene, and farnesene.

Particularly common examples of diolefin include 1,3-butadiene and isoprene. One of these may be used singly, or two or more of these may be used in combination.

Examples of the vinyl aromatic compound used in the polymer block (S) in the hydrogenated block copolymer (a) in the film of the present embodiment include, but not limited to, vinyl aromatic compounds such as styrene, α-methylstyrene, p-methylstyrene, divinylbenzene, 1,1-diphenylethylene, N,N-dimethyl-p-aminoethyl styrene, and N,N-diethyl-p-aminoethyl styrene.

Of these, styrene, α-methylstyrene, and 4-methylstyrene are preferably used from the viewpoint of availability and productivity. Styrene is particularly preferred. The polymer block (S) may be constituted by one type of vinyl aromatic compound unit or may be constituted by two or more types of these units.

Incidentally, the conjugated diene compound and the vinyl aromatic compound mentioned below can also be applied to the hydrogenated block copolymer (b1) and hydrogenated block copolymer (b2) mentioned below.

The content of the polymer block mainly comprising a vinyl aromatic compound (S) in the hydrogenated block copolymer (a) is 1 to 20% by mass.

The content of the polymer block mainly comprising a vinyl aromatic compound (S) is preferably 2 to 18% by mass, more preferably 3 to 15% by mass, still more preferably 3 to 13% by mass, from the viewpoint of the transparency and flexibility of the film of the present embodiment.

The degree of hydrogenation of the hydrogenated block copolymer (a), that is, the degree of hydrogenation of total conjugated diene compound units contained in the hydrogenated block copolymer (a) is 80 mol % or more.

The above degree of hydrogenation is preferably 85 mol % or more, more preferably 90 mol % or more, from the viewpoint of the transparency, flexibility, and water vapor barrier property of the film of the present embodiment The degree of hydrogenation of the total unsaturated group units contained in the conjugated diene monomer unit of the hydrogenated block copolymer (a) can be measured by nuclear magnetic resonance spectrometry analysis (NMR), and specifically, can be measured by the method described in examples mentioned below.

Allowing the degree of hydrogenation of the hydrogenated block copolymer (a) to be 80 mol % or more increases the crystallization of the polymer block (C) and makes the transparency, flexibility, and water vapor barrier properties of molded articles of the resin composition mixed with the hydrogenated block copolymer (a) polypropylene satisfactory.

When a resin composition prepared by mixing the hydrogenated block copolymer (a) with a polypropylene resin is used as a material for the film, the solubility parameter of the polymer block (B) becomes close to the solubility parameter of the polypropylene resin, and the dispersibility of the hydrogenated block copolymer (a) becomes satisfactory. Thus, flexibility and transparency will become satisfactory.

The degree of hydrogenation can be controlled by, for example, the amount of the catalyst on hydrogenation. The hydrogenation rate can be controlled by, for example, the amount of the catalyst, amount of hydrogen fed, pressure, and temperature on hydrogenation.

The film of the present embodiment also satisfies the following:

a content of the vinyl aromatic compound monomer unit in the hydrogenated block copolymer (a) is 3 to 13% by mass, the hydrogenated block copolymer (a) has a degree of hydrogenation of 90 mol %, an amount of butylene and/or amount of propylene in the hydrogenated block copolymer (a) is 60 to 85 mol % based on 100 mol % of the conjugated diene compound unit in total, the hydrogenated block copolymer (a) has a crystallization peak at 0 to 60° C., the hydrogenated block copolymer (a) has a heat quantity of crystallization of 1.0 to 8.0 J/g, and the hydrogenated block copolymer (a) has a Shore A hardness of 25 to 55.

The amount of butylene and the amount of propylene herein mean the butylene monomer unit and the isoprene monomer unit after hydrogenation, respectively.

The amount of butylene and/or amount of propylene, crystallization peak temperature, heat quantity of crystallization, and Shore A hardness described above can be controlled by, for example, using a hydrogenated block copolymer comprising a polymer block mainly comprising a conjugated diene compound (C), a polymer block mainly comprising a conjugated diene compound (B), and a polymer block mainly comprising a vinyl aromatic compound (S), as the hydrogenated block copolymer (a), as aforementioned.

The amount of butylene and/or amount of propylene, crystallization peak temperature, heat quantity of crystallization, and Shore A hardness described above can be measured specifically by the methods described in examples mentioned below.

It is preferred that the film of the present embodiment have a thickness of the outer layer of 5 to 50 µm, a thickness of the intermediate layer of 100 to 200 µm, and a thickness of the inner layer of 5 to 50 µm.

When the layers each are within the numerical value range described above, satisfactory flexibility, impact resistance, and heat sealability can be achieved.

The thickness of the outer layer is more preferably 10 to 40 µm, still more preferably 15 to 35 µm.

The thickness of the intermediate layer is more preferably 110 to 190 µm, still more preferably 120 to 180 µm.

The thickness of the inner layer is more preferably 10 to 45 µm, still more preferably 15 to 40 µm.

Generally, a sheet molded article having a thickness of 0.005 mm or more and less than 0.25 mm is called a film, and a sheet molded article having a thickness of 0.25 mm or more and 50 mm or less is called a sheet. In the present description, the "film" includes the film and sheet described above.

In the film of the present embodiment, it is preferred that the integrated amount of elution at −20° C. or less measured by cross-fractionation chromatography (hereinafter, referred to as "CFC") be 0.1% or more and less than 40% based on the total integrated amount of elution, the integrated amount of elution in the range of more than −20° C. and less than 60° C. be 20% or more and less than 95% based on the total integrated amount of elution, and the integrated amount of elution in the range of 60° C. or more and 150° C. or less be 5% or more and less than 70% based on the total integrated amount of elution.

Having the above configuration, a film can be provided having excellent transparency, flexibility, heat sealability, and impact resistance and an excellent balance between these properties.

Likewise, from the viewpoint of the transparency, flexibility, heat sealability, impact resistance, and balance between these properties, the integrated amount of elution at −20° C. or less is preferably 2% or more and less than 30%, more preferably 3% or more and less than 20% based on the total integrated amount of elution. The integrated amount of elution in the range of more than −20° C. and less than 60° C. is preferably 10% or more and less than 50%, more preferably 20% or more and less than 45% based on the total integrated amount of elution. The integrated amount of elution in the range of 60° C. or more and 150° C. or less is more preferably 50% or more and less than 90%, still more preferably 55% or more and less than 80% based on the total integrated amount of elution.

The above amount of CFC elution can be controlled by adjusting the ratio of each the polymer blocks (C) and (B), the blending ratio of the hydrogenated block copolymer (a1), and the type of the polypropylene resin. The above amount of CFC elution can be measured by the method described in examples mentioned below.

Further, eluted components each in the range of −20° C. or less, in the range of more than −20° C. and less than 60° C., and in the range of 60° C. or more and 150° C. or less can be collected, and it is possible to measure the content of the vinyl aromatic unit, degree of hydrogenation, amount of butylene and/or amount of propylene, crystallization peak temperature, heat quantity of crystallization, and Shore A hardness for each component by method mentioned below. Particularly, the hydrogenated block copolymer (a) is included in the range of more than −20° C. and less than 60° C.

The molecular weight distribution (Mw/Mn) of the eluted component in the range of 10° C. or more and less than 60° C. measured by cross-fractionation chromatography (CFC) is preferably 1.05 or more and 1.50 or less.

Specifically, the above molecular weight distribution (Mw/Mn) can be measured by the method described in examples mentioned below.

Examples of the hydrogenated block copolymer (a) include those having a structure represented by any one of the following general formulas:

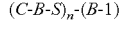

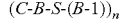

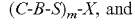

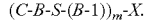

In the above general formulas, C, B, and S represent a polymer block mainly comprising a conjugated diene compound (C), a polymer block mainly comprising a conjugated diene compound (B), and a polymer block mainly comprising a vinyl aromatic compound (S), respectively.

In the above general formulas, (B-1) represents "a polymer block (B-1) present at a terminal of the hydrogenated block copolymer (a) of the polymer blocks mainly comprising a conjugated diene compound (B)" mentioned below.

n is an integer of 1 or more, preferably 1 to 6.

m is an integer of 2 or more, preferably 2 to 6.

X represents a bifunctional coupling agent residue or a multifunctional initiator residue.

The hydrogenated block copolymer (a) is preferably a polymer represented by the structural formula C-B-S or C-B-S-(B-1).

Examples of the bifunctional group coupling agent include, but not limited to, dihalogen compounds such as dimethyldichlorosilane and dimethyldibromosilane; and acid esters such as methyl benzoate, ethyl benzoate, phenyl benzoate, and phthalates.

Examples of the multifunctional coupling agent having three or more functional groups include, but not limited to, trihydric or more polyalcohols, epoxidized soybean oil, polyvalent epoxy compounds such as diglycidyl bisphenol A; halogenated silicon compounds represented by the formula $R^1_{(4-n)}SiX_n$ (wherein $R^1$ is a hydrocarbon group having 1 to 20 carbon atoms, X is a halogen, and n is an integer of 3 or 4.), and halogenated tin compounds.

Examples of the halogenated silicon compound include, but not limited to, methylsilyl trichloride, t-butylsilyl trichloride, silicon tetrachloride, and brominated products thereof.

Examples of the halogenated tin compound include, but not limited to, polyvalent halogenated compounds such as methyl tin trichloride, t-butyl tin trichloride, and tin tetrachloride. Dimethyl carbonate, diethyl carbonate, and the like also can be used.

In the above general formulas, vinyl aromatic compound monomer units in the polymer block (C), polymer block (B), and polymer block (S) may be homogeneously distributed or may be taperingly distributed. Alternatively, when the polymer block (C), polymer block (B), and polymer block (S) are copolymer blocks of vinyl aromatic compound monomer units and conjugated diene compound monomer units, the copolymer blocks may include a plurality of portions in which vinyl aromatic compound monomer units are homogeneously distributed and/or a plurality of portions in which vinyl aromatic compound monomer units are taperingly distributed. The copolymer block portions may also include a plurality of portions each having a different content of the vinyl aromatic compound monomer unit.

The structures of the hydrogenated block copolymer (a), the hydrogenated block copolymer (b1), and the hydrogenated block copolymer (b2) mentioned below are not particularly limited, may take any form of, for example, linear, branched, radial, and comb-like forms, and can be made to be a suitable structure depending on the desired physical properties or the like.

From the viewpoint of the performance to be imparted to the film of the present embodiment, that is, the transparency, flexibility, and satisfactory balance between these properties, it is preferred that the hydrogenated block copolymer (a) comprise two or more of the polymer blocks mainly comprising a conjugated diene compound (B) in a molecule and that a content of a polymer block (B-1) present at a terminal of the hydrogenated block copolymer (a) of the polymer blocks mainly comprising a conjugated diene compound (B) be 1 to 10% by mass in the hydrogenated block copolymer (a).

The content of the polymer block (B-1) present at a terminal of the hydrogenated block copolymer (a) can be controlled by means of the amount of the conjugated diene compound to be added.

The content of the polymer block (B-1) present at a terminal of the hydrogenated block copolymer (a) is preferably 2 to 8% by mass, more preferably 2 to 6% by mass in the hydrogenated block copolymer (a).

The weight average molecular weight of the hydrogenated block copolymer (a) (Mw) (hereinafter, the weight is also referred to as "Mw") is preferably 100,000 to 300,000.

The weight average molecular weight of the hydrogenated block copolymer (a) (Mw) is more preferably 110,000 to 290,000, still more preferably 120,000 to 280,000, from the viewpoint of the transparency, flexibility, and balance between these properties of the film of the present embodiment.

The Mw of the hydrogenated block copolymer (a) can be controlled by means of the amount of polymerization initiator.

The weight average molecular weight of the hydrogenated block copolymer (a) (Mw) is a weight average molecular weight (Mw) obtained by determining the molecular weight at the peak of the chromatogram obtained by the measurement by GPC based on the calibration curve determined from the measurement of commercially available standard polystyrenes (made using the molecular weight at a peak standard polystyrenes).

The ratio of the weight average molecular weight (Mw) to the number average molecule weight (Mn) of the hydrogenated block copolymer (a), (Mw)/(Mn), is preferably 1.01 to 1.30.

Specifically, the weight average molecular weight (Mw) and the number average molecule weight (Mn) can be measured by the method described in examples mentioned below.

(Method for Producing Hydrogenated Block Copolymer (a))

The hydrogenated block copolymer (a) can be produced, generally, by polymerizing conjugated diene compound monomers and vinyl aromatic compound monomers in an organic solvent with an organic alkali metal compound as the polymerization initiator followed by conducting hydrogenation.

The polymerization form may be either batch polymerization or continuous polymerization, or may be a combination thereof.

From the viewpoint of obtaining a block copolymer having a narrow molecular weight distribution and high intensity, a batch polymerization method is preferred.

The polymerization temperature is generally 0 to 150° C., preferably 20 to 120° C., more preferably 40 to 100° C.

The polymerization time, which depends on the intended polymer, is usually within 24 hours, preferably 0.1 to 10 hours. From the viewpoint of obtaining a block copolymer having a narrow molecular weight distribution and high intensity, the polymerization time is more preferably 0.5 to 3 hours.

The atmosphere of the polymerization system is not particularly limited and is only required to be in a range of pressure sufficient to maintain nitrogen and a solvent in the liquid phase.

It is preferred that impurities, such as water, oxygen, and carbon dioxide, which inactivate the polymerization initiator and living polymer be not present in the polymerization system.

Examples of the organic solvent include, but not limited to, aliphatic hydrocarbons such as n-butane, isobutane, n-pentane, n-hexane, n-heptane, and n-octane; alicyclic hydrocarbons such as cyclohexane, cycloheptane, and methylcyclopentane; and aromatic hydrocarbons such as benzene, xylene, toluene, and ethylbenzene.

As the organic alkali metal compound which is the polymerization initiator, organic lithium compounds are preferred. As the organic lithium compound, for example, but not limited to, an organic monolithium compound, organic dilithium compound, or organic polylithium compound is used.

Examples of the organic lithium compound include, but not limited to, ethyllithium, n-propyllithium, isopropyllithium, n-butyllithium, sec-butyllithium, t-butyllithium, phenyllithium, hexamethylenedilithium, butadienyllithium, and isopropenyldilithium. Of these, from the viewpoint of polymerization activity, n-butyllithium and sec-butyllithium are preferred.

The amount of the organic alkali metal compound which is the polymerization initiator to be used, depending on the molecular weight of the intended block copolymer, is generally preferably in the range of 0.01 to 0.5 phm (parts by mass per 100 parts by mass of the monomer), more preferably in the range of 0.03 to 0.3 phm, still more preferably in the range of 0.05 to 0.15 phm.

The vinyl bond content of the polymer block (B) and polymer block (C) contained in the hydrogenated block copolymer (a) can be adjusted by using a Lewis base, for example, a compound such as ether and amine as the vinylating agent. The amount of the vinylating agent to be used can be adjusted by means of the intended vinyl bond content.

Alternatively, dividedly adding the vinylating agent and a metal alkoxide mentioned below under two or more conditions enables polymer blocks each having a different vinyl bond content to be produced in a polymer block mainly comprising a conjugated diene compound.

Examples of the vinylating agent include, but not limited to, ether compounds, ether-based compounds having two or more oxygen atoms, and tertiary amine compounds.

Examples of the tertiary amine compound include, but not limited to, pyridine, N,N,N',N'-tetramethylethylenediamine, tributylamine, tetramethylpropanediamine, 1,2-dipiperidinoethane, and bis[2-(N,N-dimethylamino)ethyl]ether.

One of these may be used singly, or two or more of these may be used in combination.

As the tertiary amine compound, compounds having two amine units are preferred. Further, of these, those having a structure that exhibits symmetry in the molecule are more preferred. N,N,N',N'-tetramethylethylenediamine, bis[2-(N,N-dimethylamino)ethyl]ether, and 1,2-dipiperidinoethane are more preferred.

In the present embodiment, copolymerization of a hydrogenated block copolymer may be carried out under coexistence of the aforementioned vinylating agent, an organic lithium compound, and an alkali metal alkoxide. The alkali metal alkoxide herein is a compound represented by the general formula MOR, wherein M is an alkali metal, and R is an alkyl group.

As the alkali metal of the alkali metal alkoxide, from the viewpoint of a high vinyl bond content, a narrow molecular weight distribution, a high polymerization rate, and a high block ratio, sodium or potassium is preferred.

Examples of the alkali metal alkoxide include, but not limited to, preferably sodium alkoxides, lithium alkoxides, and potassium alkoxides having an alkyl group having 2 to 12 carbon atoms, more preferably sodium alkoxides and potassium alkoxides having an alkyl group having 3 to 6 carbon atoms, still more preferably sodium-t-butoxide, sodium-t-pentoxide, potassium-t-butoxide, and potassium-t-pentoxide.

Of these, even more preferred are sodium-t-butoxide and sodium-t-pentoxide, which are sodium alkoxides.

In the polymerization step of the hydrogenated block copolymer of the present embodiment, in the case where polymerization is carried out under coexistence of a vinylating agent, an organic lithium compound, and an alkali metal alkoxide, the molar ratio of the vinylating agent to the organic lithium compound (vinylating agent/organic lithium compound) and the molar ratio of the alkali metal alkoxide to the organic lithium compound (alkali metal alkoxide/organic lithium compound) are preferably allowed to be the following molar ratios.

Vinylating agent/organic lithium compound: 0.2 to 3.0
Alkali metal alkoxide/organic lithium compound: 0.01 to 0.3

The molar ratio of the vinylating agent/organic lithium compound is preferably 0.2 or more, from the viewpoint of a high vinyl bond content and a high polymerization rate, and less than 3.0, from the viewpoint of obtaining a narrow molecular weight distribution and high hydrogenation activity.

The molar ratio of the alkali metal alkoxide/organic lithium compound is 0.01 or more, from the viewpoint of a high vinyl bond content, a high polymerization rate, and a high block ratio, and 0.3 or less, from the viewpoint of obtaining a narrow molecular weight distribution and high hydrogenation activity.

Accordingly, the polymerization rate is increased, the vinyl bond content of the intended hydrogenated block copolymer can be increased as well as its molecular weight distribution can be narrowed, and furthermore, the block ratio tends to increase. As a result, the performance to be imparted to the polypropylene resin composition prepared by combining the hydrogenated block copolymer (a) with the polypropylene resin, that is, flexibility and transparency tend to be more satisfactory.

The molar ratio of the vinylating agent/organic lithium compound in the polymerization step is more preferably 0.8 or more, from the viewpoint of a high vinyl bond content and a high polymerization rate, preferably 2.5 or less, from the viewpoint of a narrow molecular weight distribution and high hydrogenation activity, still more preferably 1.0 or more and 2.0 or less.

The molar ratio of the alkali metal alkoxide/organic lithium compound is more preferably 0.02 or more from the viewpoint of a high vinyl bond content, a high polymerization rate, and a high block ratio, more preferably 0.2 or less, from the viewpoint of a narrow molecular weight distribution and high hydrogenation activity, still more preferably 0.03 or more and 0.1 or less, even more preferably 0.03 or more and 0.08 or less.

Further, the molar ratio of the alkali metal alkoxide/vinylating agent is preferably 0.010 or more, from the viewpoint of a high vinyl bond content, a high polymerization rate, and a high block ratio, preferably 0.100 or less from the viewpoint of achieving a narrow molecular weight distribution and obtaining high hydrogenation activity, more preferably 0.012 or more and 0.080 or less, still more preferably 0.015 or more and 0.06 or less, even more preferably 0.015 or more and 0.05 or less.

An example of a method for producing polymer blocks each having a different vinyl bond content in the polymer block mainly comprising a conjugated diene compound include a method including use of a deactivator for the vinylating agent.

Examples of the deactivator include alkylmetal compounds, and the deactivator is selected from alkylaluminum, alkylzinc, and alkylmagnesium having 1 to 20 carbon atoms per alkyl substituent, and mixtures thereof.

The method of hydrogenation on producing the hydrogenated block copolymer (a) is not particularly limited. For example, by providing the block copolymer obtained above with hydrogen in the presence of a hydrogenation catalyst to thereby hydrogenate the copolymer, there can be obtained a hydrogenated block copolymer in which double-bond residues of the conjugated diene compound unit are hydrogenated.

The degree of hydrogenation can be controlled by means of, for example, the amount of the catalyst on hydrogenation. The hydrogenation rate can be controlled by means of, for example, the amount of the catalyst, amount of hydrogen fed, pressure, and temperature on hydrogenation.

Pellets of the hydrogenated block copolymer (a) can be produced by pelletizing the hydrogenated block copolymer (a).

Examples of a pelletizing method include a method including extruding the hydrogenated block copolymer into a strand form from a single screw or twin screw extruder and cutting the extruded product in water with a rotary blade installed at the front face of a die portion; a method including extruding the hydrogenated block copolymer in a strand form from a single screw or twin screw extruder and cutting the extruded product with a strand cutter after water cooling or air cooling; and a method including shaping the hydrogenated block copolymer into a sheet form with a roll after melt blending with an open roll or a Banbury mixer, further, cutting the sheet into a strip form, and thereafter cutting the strip-formed sheet into a cuboidal pellet with a pelletizer.

Incidentally, the size and shape of a pellet molded product of the hydrogenated block copolymer (a) are not particularly limited.

An antiblocking agent for pellets can be blended in pellets of the hydrogenated block copolymer, as required, for the purpose of preventing blocking of pellets.

Examples of the antiblocking agent for pellets include, but not limited to, calcium stearate, magnesium stearate, zinc stearate, polyethylene, polypropylene, ethylene bis stearylamide, talc, and amorphous silica.

Calcium stearate, polyethylene, and polypropylene are preferred from the viewpoint of the transparency of the film of the present embodiment.

A preferable amount of antiblocking agent for pellets is 200 to 8,000 ppm with respect to the hydrogenated block copolymer (a). A more preferable amount is 300 to 7,000 ppm with respect to the hydrogenated block copolymer (a).

The antiblocking agent for pellets is preferably blended in a state in which the agent is stuck to the surface of pellets, and a certain amount of the agent can be included inside the pellets.

(Polypropylene Resin)

Examples of the polypropylene resin include random polypropylene resins, homopolypropylene resins, and block polypropylene resins.

The polypropylene resin is preferably a random polypropylene resin.

Here, "random" in random polypropylene refers to a copolymer of propylene with monomers other than propylene in which the monomers other than propylene are randomly incorporated in a propylene chain and substantially do not link each other.

The random polypropylene is not particularly limited provided that a content of the propylene unit is less than 99.5% by mass. Preferable examples of the random polypropylene include random copolymers of propylene and ethylene or random copolymers of propylene and an α-olefin having 4 to 20 carbon atoms.

When, as random polypropylene, a random copolymer of propylene and ethylene or a random copolymer of propylene and an α-olefin having 4 to 20 carbon atoms is used, flexibility, transparency, and impact resistance tend to be more satisfactory.

Example of the α-olefin include, but not limited to, ethylene, 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene. α-olefins having 2 to 8 carbon atoms are preferred, and examples thereof, specifically, include ethylene, 1-butene, 3-methyl-1-butene, 1-hexene, and 4-methyl-1-pentene.

One of these α-olefins may be used singly, or two or more of these may be used in combination. One of random polypropylenes also may be used singly or two or more of these may be used in combination.

Of random polypropylenes, from the viewpoint of the flexibility, transparency, mechanical strength of the film of the present embodiment, it is more preferred to use at least one selected from the group consisting of propylene-ethylene random copolymers, propylene-1-butene random copolymers, and propylene-ethylene-1-butene random terpolymers.

From the viewpoint of the flexibility, transparency, and balance between these properties, the random polypropylene is a random copolymer of propylene and ethylene or a random copolymer of propylene and an α-olefin having 4 to 12 carbon atoms. A content of the ethylene or α-olefin unit in the random polypropylene is preferably more than 0.5% by mass and less than 40% by mass, and a content of the propylene units is preferably 60% by mass or more and less than 99.5% by mass.

From the similar viewpoint similar to the above, the content of the ethylene or α-olefin unit is more preferably more than 1% by mass and less than 30% by mass, still more preferably 1.5% by mass or more and less than 25% by mass, even more preferably 2% by mass or more and less than 20% by mass.

The content of the propylene unit is more preferably 70% by mass or more and less than 99% by mass, still more preferably 75% by mass or more and less than 98.5% by mass, even more preferably 80% by mass or more and less than 98% by mass.

The content of the propylene unit, the content of the ethylene unit, and the content of the α-olefin unit in the random polypropylene can be determined by the carbon nuclear magnetic resonance (13C-NMR) method.

The melt flow rate of the random polypropylene (MFR; 230° C., in compliance with ISO 1133) is preferably 1 to 30 g/10 min, more preferably 1 to 25 g/10 min, still more preferably 2 to 20 g/10 min, even more preferably 3 to 15 g/10 min, from the viewpoint of the processability and low stickiness of a polypropylene resin composition to be obtained.

The catalyst used on producing the random polypropylene is not particularly limited, and preferred is a polymerization method in which a stereoregular catalyst is employed, for example. Examples of the stereoregular catalyst include, but not limited to, Ziegler catalysts and metallocene catalysts. Of these catalysts, metallocene catalysts are preferred from the viewpoint of the transparency, flexibility, and mechanical strength of the film of the present embodiment.

The molecular weight distribution of the random polypropylene (Mw/Mn) is preferably 3.5 or less, from the viewpoint of the transparency, flexibility, and mechanical strength of the film of the present embodiment.

Mw/Mn is preferably 3.0 or less, still more preferably 2.8 or less.

The lower limit of Mw/Mn is not particularly limited and preferably 1.5 or more. Especially, it is preferred that the random polypropylene be one polymerized with a metallocene-based catalyst and have a molecular weight distribution (Mw/Mn) of 1.5 or more and 3.5 or less. The molecular weight distribution of the random polypropylene can be determined by the ratio of the weight average molecular weight (Mw) to the number average molecular weight (Mn) obtained by GPC measurement.

The inner layer, intermediate layer, and outer layer of the film of the present embodiment may contain other additives depending on the required performance.

Examples of the additives include, but not limited to, a fire retardant, a stabilizer, a colorant, a pigment, an antioxidant, an antistatic agent, a disperser, a flow enhancing agent, a mold-releasing agent such as metallic stearate, silicone oil, a mineral oil-based softener, a synthetic resin-based softener, a copper inhibitor, a cross-linker, and a nucleating agent.

(Configuration of Film)

The film of the present embodiment comprises at least an outer layer, an intermediate layer, and an inner layer as aforementioned.

The outer layer comprises a polypropylene resin, the intermediate layer comprises a polypropylene resin and a hydrogenated block copolymer (a), and the inner layer comprises a polypropylene resin.

A content of the polypropylene resin in the outer layer is preferably 60 to 100% by mass, more preferably 65 to 100% by mass, still more preferably 70 to 100% by mass.

The outer layer may contain the hydrogenated block copolymer (a). In this case, a content of hydrogenated block copolymer (a) in the outer layer is preferably 0 to 40% by mass, more preferably 0 to 35% by mass, still more preferably 0 to 30% by mass.

A content of polypropylene resin in the intermediate layer is preferably 30 to 90% by mass, more preferably 35 to 85% by mass, still more preferably 40 to 80% by mass.

A content of the hydrogenated block copolymer (a) in the intermediate layer is preferably 10 to 70% by mass, more preferably 15 to 65% by mass, still more preferably 20 to 60% by mass.

A content of the polypropylene resin in the inner layer is preferably 50 to 95% by mass, more preferably 55 to 90% by mass, still more preferably 60 to 85% by mass.

The inner layer may contain the hydrogenated block copolymer (a). In this case, a content of the hydrogenated block copolymer (a) in the inner layer is preferably 5 to 50% by mass, more preferably 10 to 45% by mass, still more preferably 15 to 40% by mass.

Having the above composition, a film can be provided having satisfactory transparency, flexibility, heat sealability, and impact resistance and a satisfactory balance between these properties.

(Suitable Specific Configuration of Inner Layer and Outer Layer)

The film of the present embodiment comprises at least an outer layer, an intermediate layer, and an inner layer, wherein the outer layer comprises a polypropylene resin, the intermediate layer comprises a polypropylene resin and a hydrogenated block copolymer (a), and the inner layer comprises a polypropylene resin, and wherein the hydrogenated block copolymer (a) comprises a polymer block mainly comprising a conjugated diene compound (C), a polymer block mainly comprising a conjugated diene compound (B), and a polymer block mainly comprising a vinyl aromatic compound (S), in a molecule, a content of the polymer block mainly comprising a conjugated diene compound (C) is 1 to 30% by mass, a content of the polymer block mainly comprising a conjugated diene compound (B) is 69 to 98% by mass, and a content of the polymer block mainly comprising a vinyl aromatic compound (S) is 1 to 20% by mass, in the hydrogenated block copolymer (a), and the polymer block mainly comprising a conjugated diene compound (C) has a vinyl bond content before hydrogenation of 1 to 25 mol %, the polymer block mainly comprising a conjugated diene compound (B) has a vinyl bond content before hydrogenation of 60 to 100 mol %, and the hydrogenated block copolymer (a) has a degree of hydrogenation of 80 mol % or more. Particularly, examples of the preferable configuration are those mentioned below.

As the preferred present embodiment, there can be exemplified a film, wherein the content of the polymer block mainly comprising a conjugated diene compound (C) is 3 to 13% by mass, the content of the polymer block mainly comprising a conjugated diene compound (B) is 74 to 96% by mass, and the content of the polymer block mainly comprising a vinyl aromatic compound (S) is 3 to 13% by mass, in the hydrogenated block copolymer (a), the total content of the polymer block mainly comprising a conjugated diene compound (C) and the polymer block mainly comprising a vinyl aromatic compound (S) is 6 to 26% by mass, and the hydrogenated block copolymer (a) has a degree of hydrogenation of 90 mol % or more.

Also as the film of the present embodiment, there can be exemplified a film comprising at least an outer layer, an intermediate layer, and an inner layer, wherein the outer layer comprises a polypropylene resin, the intermediate layer comprises a polypropylene resin and a hydrogenated block copolymer (a), and the inner layer comprises a polypropylene resin, and wherein a content of the vinyl aromatic compound monomer unit in the hydrogenated block copolymer (a) is 3 to 13% by mass, the hydrogenated block copolymer (a) has a degree of hydrogenation of 90 mol %, an amount of butylene and/or amount of propylene in the hydrogenated block copolymer (a) is 60 to 85 mol % based on 100 mol % of the conjugated diene compound unit in total, the hydrogenated block copolymer (a) has a crystallization peak at −0 to 60° C., the hydrogenated block copolymer (a) has a heat quantity of crystallization of 1.0 to 8.0 J/g, and the hydrogenated block copolymer (a)has a Shore A hardness of 25 to 55.

The film of the present embodiment may be a three-layered film formed by layering an outer layer, an intermediate layer, and an inner layer which are of the same type.

<First Configuration>

In the film of the present embodiment, it is preferred that the outer layer comprises the hydrogenated block copolymer (a) and/or a hydrogenated block copolymer (b1) (provided that the block copolymer (b1) does not comprise the polymer block mainly comprising a conjugated diene compound (C)), that the hydrogenated block copolymer (b1) comprises a polymer block mainly comprising a conjugated diene compound (B1) and a polymer block mainly comprising a vinyl aromatic compound (S1), that a content of the polymer block mainly comprising a conjugated diene compound (B1) be 75 to 92% by mass and a content of the polymer block mainly comprising a vinyl aromatic compound (S1) be 8 to 25% by mass in the hydrogenated block copolymer (b1), that the vinyl bond content before hydrogenation of the polymer block mainly comprising a conjugated diene compound (B1) be 40 to 100 mol %, and the hydrogenated block copolymer (b1) have a degree of hydrogenation of 80 mol % or more, that a content of the polypropylene resin in the outer layer be 60 to 100% by mass, and that a content of the hydrogenated block copolymer (a) and/or hydrogenated block copolymer (b1) in the outer layer be 0 to 40% by mass.

Having the above configuration, a film can be provided having excellent transparency and flexibility and an excellent balance between these properties.

Incidentally, in the hydrogenated block copolymer (b1), the definition of "mainly comprising", materials such as the conjugated diene compound and vinyl aromatic compound, vinyl bond content, and degree of hydrogenation can be defined and controlled in the same manner as for the aforementioned hydrogenated block copolymer (a).

<Second Configuration>

In the film of the present embodiment, it is preferred that the inner layer comprises the hydrogenated block copolymer (a) and/or a hydrogenated block copolymer (b1) (provided that the block copolymer (b1) does not comprise the polymer block mainly comprising a conjugated diene compound (C)), that the hydrogenated block copolymer (b1) comprises a polymer block mainly comprising a conjugated diene compound (B1) and a polymer block mainly comprising a vinyl aromatic compound (S1), that a content of the polymer block mainly comprising a conjugated diene compound (B1) be 75 to 92% by mass and a content of the polymer block mainly comprising a vinyl aromatic compound (S1) be 8 to 25% by mass in the hydrogenated block copolymer (b1), that the vinyl bond content before hydrogenation of the polymer block mainly comprising a conjugated diene compound (B1) be 40 to 100 mol %, and the hydrogenated block copolymer (b1) have a degree of hydrogenation of 80 mol % or more, that a content of the polypropylene resin in the inner layer be 50 to 96% by mass, and that a content of the hydrogenated block copolymer (a) and/or hydrogenated block copolymer (b1) in the inner layer be 5 to 50% by mass.

Having the above configuration, a film can be provided having excellent transparency, flexibility and an excellent balance between these properties.

Incidentally, in the hydrogenated block copolymer (b1), the definition of "mainly comprising", materials such as the conjugated diene compound and vinyl aromatic compound, the vinyl bond content, and the degree of hydrogenation can be defined and controlled in the same manner as for the aforementioned hydrogenated block copolymer (a).

<Third Configuration>

In the film of the present embodiment, it is preferred that the outer layer further comprises a hydrogenated block copolymer (b2), that the hydrogenated block copolymer (b2) comprises a polymer block mainly comprising a conjugated diene compound (B2) and a polymer block mainly comprising a vinyl aromatic compound (S2), that a content of the polymer block mainly comprising a conjugated diene compound (B2) be 75 to 92% by mass and a content of the polymer block mainly comprising a vinyl aromatic compound (S2) be 8 to 25% by mass in the hydrogenated block copolymer (b2), that the polymer block mainly comprising a conjugated diene compound (B) has a vinyl bond content before hydrogenation of 62 to 100 mol %, and the hydrogenated block copolymer (b2) has a degree of hydrogenation of 80 mol % or more, that the hydrogenated block copolymer (b2) comprises two or more of the polymer blocks mainly comprising a conjugated diene compound (B2) in a molecule, and that a content of a polymer block (B-2) present at a terminal of the hydrogenated block copolymer (b2) of the polymer block mainly comprising a conjugated diene compound (B2) be 1 to 10% by mass in the hydrogenated block copolymer.

<Fourth Configuration>

In the film of the present embodiment, it is preferred that the inner layer further comprises a hydrogenated block copolymer (b2), that the hydrogenated block copolymer (b2) comprises a polymer block mainly comprising a conjugated diene compound (B2) and a polymer block mainly comprising a vinyl aromatic compound (S2), that a content of the polymer block mainly comprising a conjugated diene compound (B2) be 75 to 92% by mass and a content of the polymer block mainly comprising a vinyl aromatic compound (S2) be 8 to 25% by mass in the hydrogenated block copolymer (b2), that the polymer block mainly comprising a conjugated diene compound (B) has a vinyl bond content before hydrogenation of 62 to 100 mol %, and the hydrogenated block copolymer (b2) has a degree of hydrogenation of 80 mol % or more, that the hydrogenated block copolymer (b2) comprises two or more of the polymer blocks mainly comprising a conjugated diene compound (B2) in a molecule, and that a content of a polymer block (B-2) present at a terminal of the hydrogenated block copolymer (b2) of the polymer block mainly comprising a conjugated diene compound (B2) be 1 to 10% by mass in the hydrogenated block copolymer.

In the <Third Configuration>, it is preferred that the content of the polypropylene resin in the outer layer be 60 to 100% by mass and that the content of the hydrogenated block copolymer (a) and/or hydrogenated block copolymer (b1) and/or hydrogenated block copolymer (b2) in the outer layer be 0 to 40% by mass.

In the <Fourth Configuration>, it is preferred that the content of the polypropylene resin in the inner layer be 50 to 95% by mass and that the content of the hydrogenated block copolymer (a) and/or hydrogenated block copolymer (b1) and/or hydrogenated block copolymer (b2) in the inner layer be 5 to 50% by mass.

Having the above configuration, a film can be provided having excellent transparency, flexibility, heat sealability, and impact resistance and an excellent balance between these properties.

The content of the polymer block (B-2) present at a terminal of the hydrogenated block copolymer (b2) can be controlled by means of the amount of the conjugated diene compound to be added.

The content of the polymer block (B-2) present at a terminal of the hydrogenated block copolymer (b2) is preferably 2 to 8% by mass, more preferably 2 to 6% by mass in the hydrogenated block copolymer (b2).

(Method for Producing Hydrogenated Block Copolymer (b1) and Hydrogenated Block Copolymer (b2))

The hydrogenated block copolymer (b1) and the hydrogenated block copolymer (b2) can be produced in the same manner as for the aforementioned hydrogenated block copolymer (a).

(Exemplary Structures of Hydrogenated Block Copolymer (b1))

Examples of the aforementioned hydrogenated block copolymer (b1) include those having a structure represented by any one of the following general formulas:

$(S1-B1)_n$, $S1-(B1-S1)_n$, $B1-(S1-B1)_n$, $[(B1-S1)_n]_m-Z$, $[(S1-B1)_n]_m-Z$, $[(B1-S1)_n-B1]_m-Z$, and $[(S1-B1)_n-S1]_m-Z$.

In the above general formulas, S1 is a polymer block mainly comprising a vinyl aromatic compound monomer unit (S1), and B1 is a polymer block mainly comprising a conjugated diene compound monomer unit (B1).

The boundary between the polymer block (S1) and the polymer block (B1) need not necessarily be clear.

n is an integer of 1 or more, preferably an integer of 1 to 5.

m is an integer of 2 or more, preferably 2 to 11, more preferably 2 to 8.

Z represents a coupling agent residue. The coupling agent residue herein means a residue of a coupling agent after being used to bond a plurality of copolymers comprising conjugated diene compound monomer units and vinyl aromatic hydrocarbon compound monomer units between a polymer block (S1) and a polymer block (S1), between a polymer block (B1) and a polymer block (B1), or between a polymer block (S1) and a polymer block (B1).

Examples of the coupling agent include bifunctional coupling agents and multifunctional coupling agents. Examples of the bifunctional group coupling agent include, but not limited to, dihalogen compounds such as dimethyldichlorosilane and dimethyldibromosilane; and acid esters such as methyl benzoate, ethyl benzoate, phenyl benzoate, and phthalates.

Examples of the multifunctional coupling agent having three or more functional groups include, but not limited to, trihydric or more polyalcohols, epoxidized soybean oil, polyvalent epoxy compounds such as diglycidyl bisphenol A; halogenated silicon compounds represented by the formula $R^1_{(4-n)}SiX_n$ (wherein $R^1$ is a hydrocarbon group having 1 to 20 carbon atoms, X is a halogen, and n is an integer of 3 or 4.), and halogenated tin compounds.

Examples of the halogenated silicon compound includes, but not limited to, methylsilyl trichloride, t-butylsilyl trichloride, silicon tetrachloride, and brominated products thereof.

Examples of the halogenated tin compound include, but not limited to, polyvalent halogenated compounds such as methyl tin trichloride, t-butyl tin trichloride, and tin tetrachloride. Dimethyl carbonate, diethyl carbonate, and the like also can be used.

In the above general formulas, vinyl aromatic compound monomer units in the polymer block (S1) and the polymer block (B1) may be homogeneously distributed or may be taperingly distributed. Alternatively, when the polymer block (S1) and the polymer block (B1) are copolymer blocks of vinyl aromatic compound monomer units and conjugated diene compound monomer units, the copolymer block may include a plurality of portions in which vinyl aromatic compound monomer units are homogeneously distributed and/or a plurality of portions in which vinyl aromatic compound monomer units are taperingly distributed. The copolymer block portions may also include a plurality of portions each having a different content of the vinyl aromatic compound monomer unit.

(Exemplary Structures of Hydrogenated Block Copolymer (b2))

Examples of the aforementioned hydrogenated block copolymer (b2) include those having a structure represented by any one of the following general formulas:

$(S2-B2)_n$, $B2-(S2-B2)_n$, $[(B2-S2)_n]_m-Z$, and $[(B2-S2)_n-B2]_m-Z$.

In the above general formulas, S2 is a polymer block (S2) mainly comprising a vinyl aromatic compound monomer unit, and B2 is a polymer block (B2) mainly comprising a conjugated diene compound monomer unit.

The boundary between the polymer block (S2) and the polymer block (B2) need not necessarily be clear.

n is an integer of 1 or more, preferably an integer of 1 to 5.

m is an integer of 2 or more, preferably 2 to 11, more preferably 2 to 8.

Z represents a coupling agent residue.

The coupling agent residue herein means a residue of a coupling agent after being used to bond a plurality of copolymers comprising conjugated diene compound monomer units and vinyl aromatic hydrocarbon compound monomer units between a polymer block (S2) and a polymer block (S2), between a polymer block (B2) and a polymer block (B2), or between a polymer block (S2) and a polymer block (B2).

Examples of the coupling agent includes bifunctional coupling agents and multifunctional coupling agents.

Examples of the bifunctional group coupling agent include, but not limited to, dihalogen compounds such as dimethyldichlorosilane and dimethyldibromosilane; and acid esters such as methyl benzoate, ethyl benzoate, phenyl benzoate, and phthalates.

Examples of the multifunctional coupling agent having three or more functional groups include, but not limited to, trihydric or more polyalcohols, epoxidized soybean oil, polyvalent epoxy compounds such as diglycidyl bisphenol A; halogenated silicon compounds represented by the formula $R^1_{(4-n)}SiX_n$ (wherein $R^1$ is a hydrocarbon group having 1 to 20 carbon atoms, X is a halogen, and n is an integer of 3 or 4.), and halogenated tin compounds.

Examples of the halogenated silicon compound includes, but not limited to, methylsilyl trichloride, t-butylsilyl trichloride, silicon tetrachloride, and brominated products thereof.

Examples of the halogenated tin compound include, but not limited to, polyvalent halogenated compounds such as methyl tin trichloride, t-butyl tin trichloride, and tin tetrachloride. Dimethyl carbonate, diethyl carbonate, and the like also can be used.

In the above general formulas, vinyl aromatic compound monomer units in the polymer block (S2) and the polymer block (B2) may be homogeneously distributed or may be taperingly distributed. Alternatively, when the polymer block (S2) and the polymer block (B2) are copolymer blocks of vinyl aromatic compound monomer units and conjugated diene compound monomer units, the copolymer block may include a plurality of portions in which vinyl aromatic compound monomer units are homogeneously distributed and/or a plurality of portions in which vinyl aromatic compound monomer units are taperingly distributed. The copolymer block portions may also include a plurality of portions each having different content of the vinyl aromatic compound monomer unit.

As the hydrogenated block copolymer (b2), structures represented by the following general formulas are particularly preferred.

That is, structures in which a polymer block (B-2), of polymer blocks mainly comprising a conjugated diene compound (B2), is present at a terminal of the hydrogenated block copolymer (b2) are particularly preferred.

$$S2\text{-}B2\text{-}S2\text{-}(B\text{-}2)$$

$$S2\text{-}(B2\text{-}S2)_n\text{-}(B\text{-}2), \text{ and}$$

$$(B\text{-}2)\text{-}S2\text{-}(B2\text{-}S2)_n\text{-}(B\text{-}2).$$

The aforementioned hydrogenated block copolymer (b2) falls into the concept of the hydrogenated block copolymer (b1) and has a preferred configuration from the viewpoint of the properties of the film of the present embodiment even in the hydrogenated block copolymer (b1).

The film of the present embodiment may comprise both the hydrogenated block copolymer (b1) and hydrogenated block copolymer (b2) in the outer layer and/or the inner layer. In such a case, the content of the hydrogenated block copolymer (b2) and the content of the hydrogenated block copolymer (b1) in the outer layer and/the inner layer can be found by checking the amount produced of one comprising the constituent of the hydrogenated block copolymer (b2) and the amount produced of a hydrogenated block copolymer not comprising the constituent of the hydrogenated block copolymer (b2), that is, the hydrogenated block copolymer (b1), in the step of producing each layer of the film, by means of the amount of monomers added and the method of addition.

(Method for Producing Materials Constituting Each of Layers of Film)

After appropriate selection of, for example, a hydrogenated block copolymer (a), a polypropylene resin, a hydrogenated block copolymer (b1), a hydrogenated block copolymer (b2), and other components added as required, resin materials constituting each of layers of the film of the present embodiment can be produced by a method including dry-blending these components, a method including adjusting these components with an apparatus usually provided for mixing polymer substances, or the like.

Examples of the mixing apparatus include, but not particularly limited to, kneading apparatuses such as Bumbary mixers, kneaders, Labo Plastomills, single screw extruders, and twin screw extruders. Production by a melt mixing method using an extruder is preferred from the viewpoint of productivity and good kneadability.

The melting temperature on kneading can be set as appropriate and is usually in the range of 130 to 300° C., preferably in the range of 150 to 250° C.

(Method for Forming Film)

The method for producing the film of the present embodiment is not particularly limited. For example, as a molding method including placing a polypropylene resin composition into an extruder and extruding the composition, a T-die method, an inflation method and the like can be employed.

As inflation molding, normal air-cooled inflation molding, air-cooled two-stage inflation molding, high-speed inflation molding, water-cooled inflation molding and the like can be employed.

Blow molding methods such as direct blow and injection blow, and press molding methods also can be employed.

As the extruder to be employed, a single screw or multiscrew extruder can be used. A plurality of extruders can be used to form a multi-layered film which has been formed by multi-layer-extrusion.

Alternatively, it is possible to form a film directly from the extruder used when the polypropylene resin composition is produced.

The film of the present embodiment has excellent transparency and flexibility and an excellent balance between these properties, as shown in examples described below.

By making use of the above properties, the film of the present embodiment can be used in various apparel packaging, various food packaging, daily necessaries packaging, industrial material packaging, various rubber products, resin products, laminates for leather products and the like, stretch tape for paper diapers and the like, industrial products such as dicing films, protect films used for construction materials and steel sheets, base materials for adhesive films, meat and fish trays, fruit and vegetables packs, sheet products such as frozen food containers, home electronics applications such as televisions, stereos, and vacuum cleaners, automobile interior and exterior parts applications such as bumper parts, body panels, and side seals, road-paving materials, waterproof and impervious sheets, civil engineering packings, commodities, leisure goods, toys, industrial products, furniture products, stationery such as writing instruments, clear pockets, holders, and file spines, and medical products such as infusion bags.

Particularly, the film can be suitably used as medical films and packaging materials, for example, food packaging materials, apparel packaging materials and the like.

EXAMPLES

The present embodiment will be now specifically described with reference to examples, but the present embodiment is not limited to these examples.

In examples and comparative examples, in accordance with methods described below, hydrogenated block copolymers were prepared, films were produced with the copolymers, and their physical properties were compared.

Meanwhile, properties of the hydrogenated block copolymers and physical properties of the films were measured as follows.

[Method for Evaluating Hydrogenated Block Copolymer]

(1) Content of Total Vinyl Aromatic Compound Units (Hereinafter, also Denoted as "Styrene Content")

The content of the total vinyl aromatic compound monomer units in the hydrogenated block copolymer was measured, using the hydrogenated block copolymer after hydrogenation, by proton nuclear magnetic resonance spectrometry ($^1$H-NMR).

Using a JNM-LA400 (manufactured by JEOL) as a measuring instrument and deuterated chloroform as a solvent, measurement was performed at a sample concentration of 50 mg/mL, an observation frequency of 400 MHz, a pulse delay of 2.904 sec, a number of scans of 64, a pulse width of 45°, and a measurement temperature of 26° C., using tetramethylsilane as a chemical shift reference.

The styrene content was calculated using the total integrated value of signals from aromatic styrene at 6.2 to 7.5 ppm in a spectrum.

(2) Vinyl Bond Content Before Hydrogenation

As for the vinyl bond content before hydrogenation, a polymer sampled from each step in the polymerization process of the block copolymer before hydrogenation was measured by proton nuclear magnetic resonance spectrometry ($^1$H-NMR) to thereby obtain the vinyl bond content before hydrogenation of the polymer block.

The measurement conditions and the processing method of measured data were the same as in (1) above.

The vinyl bond content was calculated from a ratio of 1,4-bond to 1,2-bond after calculating an integrated value per 1H of each bond form from the integrated values of signals ascribed to 1,4-bond and 1,2-bond.

(3) Degree of Hydrogenation

The degree of hydrogenation of the hydrogenated block copolymer was measured, using the hydrogenated block copolymer after hydrogenation, by proton nuclear magnetic resonance spectrometry ($^1$H-NMR).

The measurement conditions and the processing method of measured data were the same as in (1) above.

The integrated value of signals originating from a residual double bond at 4.5 to 5.5 ppm and the integrated value of signals originating from the hydrogenated conjugated diene were calculated, and the ratio thereof was calculated as the degree of hydrogenation.

(4) Measurement of Number Average Molecule Weight (Mn), Weight Average Molecular Weight (Mw), and Molecular Weight Distribution The number average molecular weight (Mn) and weight average molecular weight (Mw) of the hydrogenated block copolymer was determined by gel permeation chromatography (GPC) measurement (LC-10 manufactured by SHIMADZU CORPORATION) under conditions of column: TSKgelGMHXL (4.6 mm ID×30 cm, two) and solvent: tetrahydrofuran (THF), as the molecular weight in terms of polystyrene by means of commercially available standard polystyrene.

The molecular weight distribution of the hydrogenated block copolymer was determined as the ratio of the number average molecular weight (Mn) to weight average molecular weight (Mw) obtained, (Mw)/(Mn).

(5) Amount of Butylene and/or Amount of Propylene Based on 100 mol % of Conjugated Diene Compound Unit in Total Proton nuclear magnetic resonance spectrometry ($^1$H-NMR) was performed by using the hydrogenated block copolymer after hydrogenation.

The measurement conditions and the processing method of measured data were the same as in (2) and (3) above.

The integrated values of signals ascribed to butylene (hydrogenated 1,2-bond) and propylene (hydrogenated 3,4-bond) at 0 to 2.0 ppm in a spectrum were calculated, and the butylene content was calculated from the ratio between integrated values.

(6) DSC Measurement

Ten milligrams of each hydrogenated block copolymer was weighed into an aluminum pan, and measurement using a differential scanning calorimeter (DSC) (Q2000 manufactured by TA Instruments Inc.) was performed while the temperature of the copolymer in a nitrogen atmosphere (flow rate 50 mL/min) was raised from the initial temperature at −50° C. to 150° C. at a temperature rising rate of 10° C./min, maintained at 150° C. for five minutes, and then reduced to −50° C. at 10° C./min.

The crystallization temperature (° C.) was given by the crystallization peak appearing in the temperature decreasing process of a DSC curve drawn, and the heat quantity of crystallization (J/g) was given by the heat quantity represented by the crystallization peak area.

(7) Shore A Hardness of Hydrogenated Block Copolymer

For the Shore A hardness of the hydrogenated block copolymerization (in compliance with ASTM D-2240), four compression-molded sheets having a thickness of 2 mm were stacked, and a momentary value thereof was measured with a durometer type A.

[Method for Evaluating Properties of Film]

(1) Tensile Modulus

The film was punched with a JIS No. 5 Specimen to obtain a measurement sample. The tensile modulus was measured with respect to the resin flow direction of the measurement sample (MD direction) in compliance with JIS K7127 and under a tension rate condition of 200 mm/min.

The tensile modulus was calculated from stresses each corresponding to 0.05% and 0.25% strains and used as the index of flexibility. With the obtained tensile modulus, the film was evaluated based on the following criteria:

⊚: Tensile modulus of less than 400 MPa

○: Tensile modulus of 400 MPa or more and less than 500 MPa

Δ: Tensile modulus of 500 MPa or more and less than 600 MPa

X: Tensile modulus of 600 MPa or more (2) Haze

The haze of the film was measured using a haze meter (NDH-1001DP manufactured by NIPPON DENSHOKU INDUSTRIES CO., LTD) and uses as the index of transparency. With the obtained haze value, the film was evaluated based on the following criteria:

○: Haze value of less than 15

Δ: Haze value of 15 or more and less than 20

X: Haze value of 20 or more (3) Heat Sealability

After two films were layered, one surface of the layered film was heated using a heat sealer (TP-701-B manufactured by TESTER SANGYO CO., LTD.) under conditions of sealing temperature of 160° C., sealing time of five seconds, and actual pressure of 0.2 MPa to heat seal the layers, and thus, a sample was obtained.

After the obtained sample was left to stand at 23° C. for 24 hours or more, a specimen having a width of 15 mm was cut out perpendicular to the seal width direction to obtain a specimen having a 10 mm×15 mm seal portion.

Subsequently, the seal portion of the specimen was peeled off at an angle of 180° by a tensile testing machine (Minebea Inc., TGE-500N) at a rate of 200 mm/min to measure the heat sealing strength per a width of 15 mm (N/15 mm), which was used as the index of heat sealability.

With the obtained heat sealing strength, the film was evaluated based on the following criteria:

⊚: Heat seal strength at a heat sealing temperature of 160° C. of 25 N/15 mm or more ○: Heat seal strength at a heat sealing temperature of 160° C. of 15 N/15 mm or more and less than 25 N/15 mm Δ: Heat seal strength at a heat sealing temperature of 160° C. of 10 N/15 mm or more and less than 15 N/15 mm X: Heat seal strength at a heat sealing temperature of 160° C. less than 10 N/15 mm (4) Water Vapor Permeability The film was used to measure the water vapor permeability in compliance with the JIS K7129A method (humidity sensitive sensor method) by a water vapor permeation analyzer (model L80-5000, manufactured by Lyssy., Inc.).

The water vapor permeability of Comparative Example 4 was taken as the reference value of 100, and the measurement value was indexed according to the following expression:

Water vapor permeability of each film (index)=(Water vapor permeability of Example or Comparative Example)/(Water vapor permeability of Comparative Example 4)×100.

The smaller the value of the water vapor permeability, the more excellent the water vapor barrier property.
[Method for Evaluating Medical Container]
(5) Impact Resistance of Medical Container The film was cut out into 20 cm×13 cm specimens. Two specimens were layered, and the three sides of the sheets were heat-sealed for 2 seconds at 145° C. to form a bag.

Into the bag, 500 mL of water was placed, and the remaining side was heat-sealed under the same conditions to produce a water-containing bag.

Further, the water-containing bag was steam-sterilized and then, was left to stand in a refrigerator at 4° C. for 24 hours. Thereafter, when 10 bags for each Examples and Comparative Examples were allowed to fall from a height of 1.8 m, and the unbroken bag ratio of the bag was measured and used as the index of impact resistance.

With the obtained unbroken bag ratio, the film was evaluated based on the following criteria:

◎: Unbroken bag ratio of 100%
○: Unbroken bag ratio of 70% or more and less than 100%
Δ: Unbroken bag ratio of 50% or more and less than 70%
X: Unbroken bag ratio less than 50%

(6) CFC Measurement of Film Molded Article

A molded article obtained in each of examples and comparative examples shown in Table 2 and Table 3 was used as a test sample to measure an elution temperature-amount of elution curve by temperature rising fractionation as follows. Determined were the amount of elution at each temperature, the integrated amount of elution, and the molecular weight distribution of the eluted component.

First, the temperature of columns containing filler was raised to 145° C. A sample solution of the hydrogenated block copolymer composition dissolved in ortho-dichlorobenzene was introduced into the columns, which were maintained at 140° C. for 30 minutes. Then, the temperature of the columns was reduced to −20° C. at a temperature decreasing rate of 1° C./min, and then, the columns were maintained for 60 minutes to allow the sample to precipitate on the filler surface.

Thereafter, the temperature of the columns was sequentially raised at a temperature rising rate of 40° C./min in increments of 5° C. The concentration of the sample eluted at each temperature was detected. Then, using values of the amount of the sample eluted (% by mass) and the temperature inside the columns at this time (° C.), an elution temperature-amount of elution curve was measured to determine the amount of elution and the molecular weight distribution at each temperature.

Instrument: CFC-type cross-fractionation chromatograph (manufactured by Polymer Char, S.A.)
Detector: IR-type infrared spectrometer (manufactured by Polymer Char, S.A.)
Detected wavelength: 3.42 μm
Column: Shodex HT-806M×3 (Showa Denko K.K.)
Column calibration: monodispersed polystyrene (TOSOH CORPORATION)
Molecular weight calibration method: standard sample calibration method (in terms of polystyrene)
Eluant: ortho-dichlorobenzene
Flow rate: 1.0 mL/min
Sample concentration: 120 mg/30 mL
Volume injected: 0.5 mL From the obtained elution temperature-amount of elution curve, determined were the integrated amount of elution in the total volume (%) at −20° C. or less, the integrated amount of elution in the total volume (%) in the range of more than −20° C. and less than 60° C., the integrated amount of elution in the total volume (%) in the range of 60° C. or more and 150° C. or less, and the molecular weight distribution of the eluted component at 10 to 60° C.
[Method for Producing Hydrogenated Block Copolymer (a)]
(Preparation of Hydrogenated Catalyst)

The hydrogenated catalyst used in hydrogenated reaction of the hydrogenated block copolymer was produced by the following method.

To a reaction vessel purged with nitrogen, 1 L of cyclohexane dried and purified was loaded, and 100 mmol of bis(η5-cyclopentadienyl)titanium dichloride was added thereto. A n-hexane solution including 200 mmol of trimethyl aluminum was added thereto with sufficient stirring, and the mixture was subjected to a reaction at room temperature for about 3 days.
(Production of Hydrogenated Block Copolymer (a-1))

A tank-type reactor having a capacity of 10 L equipped with a stirrer and a jacket was used to carry out batch polymerization.

One liter of cyclohexane was placed into the reactor, and then, 0.050 parts by mass of n-butyl lithium (hereinafter, also referred to as "Bu-Li") based on 100 parts by mass of the whole monomers and 0.05 mol of N,N,N',N'-tetramethylethylenediamine (hereinafter, also referred to as "TMEDA"), as a vinylating agent, based on 1 mol of Bu-Li were added.

As a first step, a cyclohexane solution containing 10 parts by mass of butadiene (concentration of 20% by mass) was added over 10 minutes. Thereafter, polymerization was carried out for further 10 minutes. During polymerization, the temperature was controlled to 65° C.

Then, as a second step, 1.50 mol of TMEDA and 0.05 mol of sodium t-pentoxide (hereinafter, referred to as NaOAm) were added based on 1 mol of Bu-Li. A cyclohexane solution containing 85 parts by mass of butadiene (concentration 20% by mass) was added over 60 minutes, followed by polymerization for further 10 minutes. During polymerization, the temperature was controlled to 60° C.

Then, as a third step, a cyclohexane solution containing 5 parts by mass of styrene (concentration 20% by mass) was added over five minutes followed by polymerization for further 10 minutes. During polymerization, the temperature was controlled to 65° C.

The polymer obtained in the adjustment process of the block copolymer was sampled in each step. The analysis values of the obtained block copolymer were a styrene content of 5% by mass, a weight average molecular weight of 249,000, and a molecular weight distribution of 1.12.

Subsequently, to the obtained block copolymer, the hydrogenated catalyst aforementioned was added at 100 ppm in terms of titanium based on 100 parts by mass of the block copolymer, and hydrogenation reaction was carried out at a hydrogen pressure of 0.7 MPa and a temperature of 70° C.

Thereafter, methanol was added, and then, as a stabilizer, 0.3 parts by mass of octadecyl-3-(3,5-di-t-butyl-4-hydroxyphenyl)propionate was added to the block copolymer.

The obtained hydrogenated block copolymer (a-1) had a degree of hydrogenation of 99.5% and a MFR of 2 g/10 min.

The analysis results of the obtained hydrogenated block copolymer (a-1) are shown in Table 1.

(Production of Hydrogenated Block Copolymer (a-2))

0.050 parts by mass of Bu-Li, 10 parts by mass of butadiene in the first step, 82 parts by mass of butadiene in the second step, and 5 parts by mass of styrene in the third step were used. A fourth step was added, in which a cyclohexane solution containing 3 parts by mass of butadiene (concentration 20% by mass) was added over five minutes followed by polymerization for further 10 minutes. A hydrogenated block copolymer (a-2) was produced by carrying out the same operation as for the hydrogenated block copolymer (a-1) aforementioned except that the temperature during polymerization was controlled to 65° C. to produce the copolymer.

The obtained hydrogenated block copolymer (a-2) had a styrene content of 5% by mass, a weight average molecular weight of 251,000, a molecular weight distribution of 1.14, a degree of hydrogenation of 99.8%, and a MFR of 4 g/10 min. The analysis results of the obtained hydrogenated block copolymer (a-2) are shown in Table 1.

(Production of Hydrogenated Block Copolymer (a-3))

A hydrogenated block copolymer (a-3) was produced by carrying out the same operation as for the hydrogenated block copolymer (a-1) aforementioned except that 0.060 parts by mass of Bu-Li, 15 parts by mass of butadiene in the first step, 78 parts by mass of butadiene in the second step, and 7 parts by mass of styrene in the third step were used to produce the block copolymer.

The obtained hydrogenated block copolymer (a-3) had a styrene content of 7% by mass, a weight average molecular weight of 204,000, a molecular weight distribution of 1.19, a degree of hydrogenation of 99.6%, and a MFR of 2.9 g/10 min.

The analysis results of the obtained hydrogenated block copolymer (a-3) are shown in Table 1.

(Production of Hydrogenated Block Copolymer (a-4))

A hydrogenated block copolymer (a-4) was produced by carrying out the same operation as for the hydrogenated block copolymer (a-1) aforementioned except that 0.053 parts by mass of Bu-Li, 3 parts by mass of butadiene in the first step, 85 parts by mass of butadiene in the second step, and 12 parts by mass of styrene in the third step were used to produce the block copolymer.

The obtained hydrogenated block copolymer (a-4) had a styrene content of 12% by mass, a weight average molecular weight of 225,000, a molecular weight distribution of 1.22, a hydrogenation ratio of 99.3%, and a MFR of 1.9 g/10 min.

The analysis results of the obtained hydrogenated block copolymer (a-4) are shown in Table 1.

(Production of Hydrogenated Block Copolymer (a-5))

A hydrogenated block copolymer (a-5) was produced by carrying out the same operation as for the hydrogenated block copolymer (a-1) aforementioned except that 0.042 parts by mass of Bu-Li, 6 parts by mass of butadiene in the first step, 93 parts by mass of butadiene in the second step, and 3 parts by mass of styrene in the third step were used to produce the block copolymer.

The obtained hydrogenated block copolymer (a-5) had a styrene content of 3% by mass, a weight average molecular weight of 282,000, a molecular weight distribution of 1.29, a hydrogenation ratio of 98.6%, and a MFR of 3.9 g/10 min.

The analysis results of the obtained hydrogenated block copolymer (a-5) are shown in Table 1.

(Production of Hydrogenated Block Copolymer (a-6))

A hydrogenated block copolymer (a-6) was produced by carrying out the same operation as for the hydrogenated block copolymer (a-1) aforementioned except that 0.078 parts by mass of Bu-Li, 16 parts by mass of butadiene in the first step, 72 parts by mass of butadiene in the second step, and 12 parts by mass of styrene in the third step were used to produce the block copolymer.

The obtained hydrogenated block copolymer (a-6) had a styrene content of 12% by mass, a weight average molecular weight of 161,000, a molecular weight distribution of 1.12, a hydrogenation ratio of 99.0%, and a MFR of 1.5 g/10 min.

The analysis results of the obtained hydrogenated block copolymer (a-6) are shown in Table 1.

(Production of Hydrogenated Block Copolymer (a-7))

A hydrogenated block copolymer (a-7) was produced by carrying out the same operation as for the hydrogenated block copolymer (a-1) aforementioned except that 0.099 parts by mass of Bu-Li, 17 parts by mass of butadiene in the first step, 67 parts by mass of butadiene in the second step, and 16 parts by mass of styrene in the third step were used to produce the block copolymer.

The obtained hydrogenated block copolymer (a-7) had a styrene content of 16% by mass, a weight average molecular weight of 117,000, a molecular weight distribution of 1.09, a hydrogenation ratio of 99.2%, and a MFR of 1.8 g/10 min.

The analysis results of the obtained hydrogenated block copolymer (a-7) are shown in Table 1.

(Production of Hydrogenated Block Copolymer (a-8))

A hydrogenated block copolymer (a-8) was produced by carrying out the same operation as for the hydrogenated block copolymer (a-1) aforementioned except that 0.050 parts by mass of Bu-Li, 20 parts by mass of butadiene in the first step, and 80 parts by mass of butadiene in the second step were used to produce the block copolymer.

The obtained hydrogenated block copolymer (a-8) had a styrene content of 0% by mass, a weight average molecular weight of 250,000, a molecular weight distribution of 1.08, a hydrogenation ratio of 99.5%, and a MFR of 32 g/10 min.

The analysis results of the obtained hydrogenated block copolymer (a-8) are shown in Table 1.

(Production of Hydrogenated Block Copolymer (a-9))

A hydrogenated block copolymer (a-9) was produced by carrying out the same operation as for the hydrogenated block copolymer (a-1) aforementioned except that 0.122 parts by mass of Bu-Li, 5 parts by mass of butadiene in the first step, 70 parts by mass of butadiene in the second step, and 25 parts by mass of styrene in the third step were used to produce the block copolymer.

The obtained hydrogenated block copolymer (a-9) had a styrene content of 25% by mass, a weight average molecular weight of 88,000, a molecular weight distribution of 1.11, a hydrogenation ratio of 99.0%, and a MFR of 3.1 g/10 min.

The analysis results of the obtained hydrogenated block copolymer (a-9) are shown in Table 1.

(Production of Hydrogenated Block Copolymer (a-10))

A hydrogenated block copolymer (a-10) was produced by carrying out the same operation as for the hydrogenated block copolymer (a-1) aforementioned except that 0.072 parts by mass of Bu-Li, 35 parts by mass of butadiene in the first step, 63 parts by mass of butadiene in the second step, and 2 parts by mass of styrene in the third step were used to produce the block copolymer.

The obtained hydrogenated block copolymer (a-10) had a styrene content of 2% by mass, a weight average molecular weight of 169,000, a molecular weight distribution of 1.12, a hydrogenation ratio of 98.3%, and a MFR of 4.8 g/10 min.

The analysis results of the obtained hydrogenated block copolymer (a-10) are shown in Table 1.

(Production of Hydrogenated Block Copolymer (a-11))

A hydrogenated block copolymer (a-11) was produced by carrying out the same operation as for the hydrogenated block copolymer (a-1) aforementioned except that 0.050 parts by mass of Bu-Li, 0.250 mol of TMEDA before the first step, 10 parts by mass of butadiene in the first step, 85 parts by mass of butadiene in the second step, and 5 parts by mass of styrene in the third step were used to produce the block copolymer.

The obtained hydrogenated block copolymer (a-11) had a styrene content of 5% by mass, a weight average molecular weight of 248,000, a molecular weight distribution of 1.16, a hydrogenation ratio of 99.1%, and a MFR of 9.2 g/10 min.

The analysis results of the obtained hydrogenated block copolymer (a-11) are shown in Table 1.

(Production of Hydrogenated Block Copolymer (a-12))

After a block copolymer was produced by carrying out the same operation as for the hydrogenated block copolymer (a-1) aforementioned, a hydrogenated block copolymer (a-13) having a controlled degree of hydrogenation was produced.

The obtained hydrogenated block copolymer (a-13) had a styrene content of 5% by mass, a weight average molecular weight of 253,000, a molecular weight distribution of 1.15, a hydrogenation ratio of 70.0%, and a MFR of 15.2 g/10 min.

The analysis results of the obtained hydrogenated block copolymer (a-12) are shown in Table 1.

(Production of Hydrogenated Block Copolymer (a-13))

A hydrogenated block copolymer (a-14) was produced by carrying out the same operation as for the hydrogenated block copolymer (a-1) except that 0.055 parts by mass of Bu-Li and 0.65 mol of TMEDA before the second step were used and no NaOAm was added to produce the block copolymer.

The obtained hydrogenated block copolymer (a-14) had a styrene content of 5% by mass, a weight average molecular weight of 239,000, a molecular weight distribution of 1.08, a hydrogenation ratio of 99.4%, and a MFR of 2.9 g/10 min.

The analysis results of the obtained hydrogenated block copolymer (a-14) are shown in Table 1.

The analysis results of the hydrogenated block copolymers (a-1) to (a-13) obtained as aforementioned are shown in Table 1.

TABLE 1

| | | Structure | Content of polymer block (wt %) | | | | | | | | | Vinyl bond content before hydrogenation (mol %) | | | | |
|---|---|---|---|---|---|---|---|---|---|---|---|---|---|---|---|---|
| | | | (C) | (B) | (B1) | (B2) | (S) | (S1) | (S2) | (B-1) | (B-2) | (C + S) | (C) | (B) | (B1) | (B2) | (B-1) |
| Hydrogenated block copolymer (a) | a-1 | C-B-S | 10 | 85 | | | 5 | | | | | 15 | 15 | 78 | | | |
| | a-2 | C-B-S-(B-1) | 10 | 82 | | | 5 | | | 3 | | 15 | 13 | 75 | | | 74 |
| | a-3 | C-B-S | 15 | 78 | | | 7 | | | | | 22 | 18 | 82 | | | |
| | a-4 | C-B-S | 3 | 85 | | | 12 | | | | | 15 | 10 | 77 | | | |
| | a-5 | C-B-S | 6 | 93 | | | 3 | | | | | 9 | 11 | 70 | | | |
| | a-6 | C-B-S | 16 | 72 | | | 12 | | | | | 28 | 18 | 83 | | | |
| | a-7 | C-B-S | 17 | 67 | | | 16 | | | | | 33 | 13 | 77 | | | |
| | a-8 | C-B | 20 | 80 | | | 0 | | | | | 20 | 17 | 80 | | | |
| | a-9 | C-B-S | 5 | 70 | | | 25 | | | | | 30 | 15 | 78 | | | |
| | a-10 | C-B-S | 35 | 63 | | | 2 | | | | | 37 | 15 | 77 | | | |
| | a-11 | C-B-S | 10 | 85 | | | 5 | | | | | 15 | 35 | 78 | | | |
| | a-12 | C-B-S | 10 | 85 | | | 5 | | | | | 15 | 15 | 80 | | | |
| | a-13 | C-B-S | 10 | 85 | | | 5 | | | | | 15 | 15 | 50 | | | |
| Hydrogenated block copolymer (b1) | b1-1 | S1-B1-S1 | | | 82 | | | 15 | | | | 15 | | | 78 | | |
| | b1-2 | (S1-B1)nX | | | 88 | | | 12 | | | | | | | 81 | | |
| | b1-3 | S1-B1-S1 | | | 82 | | | 18 | | | | | | | 55 | | |
| Hydrogenated block copolymer (b2) | b2-1 | S2-B2-S2-(B-2) | | | | 82 | | | 13 | | 5 | | | | | 77 | |

| | | | Degree of hydrogenation (mol %) | Molecular weight Mw (ten thousand) | (Mw)/(Mn) | Amount of butylene (mol %) | DSC Crystallization | | Hardness JIS A |
|---|---|---|---|---|---|---|---|---|---|
| | | | | | | | Temperature (° C.) | Heat quantity (J/g) | |
| Hydrogenated block copolymer (a) | | a-1 | 99.5 | 24.9 | 1.12 | 71 | 36 | 3.5 | 45 |
| | | a-2 | 99.8 | 25.1 | 1.14 | 68 | 35 | 3.7 | 38 |
| | | a-3 | 99.6 | 20.4 | 1.19 | 72 | 44 | 4.8 | 53 |
| | | a-4 | 99.3 | 22.5 | 1.22 | 75 | 8 | 1.5 | 36 |
| | | a-5 | 98.6 | 28.2 | 1.29 | 66 | 31 | 1.8 | 29 |
| | | a-6 | 99.0 | 16.1 | 1.12 | 71 | 48 | 5.1 | 62 |
| | | a-7 | 99.2 | 11.7 | 1.09 | 64 | 51 | 6.0 | 68 |
| | | a-8 | 99.5 | 25.0 | 1.08 | 67 | 55 | 7.3 | 13 |
| | | a-9 | 99.0 | 8.8 | 1.11 | 74 | 19 | 1.7 | 66 |
| | | a-10 | 98.3 | 16.9 | 1.12 | 55 | 82 | 11.2 | 67 |
| | | a-11 | 99.1 | 24.8 | 1.16 | 73 | — | 0.0 | 31 |
| | | a-12 | 70.0 | 25.3 | 1.15 | 69 | — | 0.0 | 28 |
| | | a-13 | 99.4 | 23.9 | 1.08 | 46 | 43 | 3.5 | 61 |
| Hydrogenated block copolymer (b1) | | b1-1 | 99.2 | 17.8 | | | | | |
| | | b1-2 | 98.5 | 18.9 | | | | | |
| | | b1-3 | 99.0 | 12.1 | | | | | |
| Hydrogenated block copolymer (b2) | | b2-1 | 99.0 | 17.4 | | | | | |

[Method for Producing Hydrogenated Block Copolymer ((b1): b1-1 to b1-3)]

(Hydrogenated Block Copolymer (b1-1))

A tank-type reactor having a capacity of 10 L equipped with a stirrer and a jacket was used to carry out batch polymerization. First, 1 L of cyclohexane was provided. Then, 0.065 parts by mass of n-butyl lithium (hereinafter, referred to as Bu-Li) based on 100 parts by mass of the whole monomers, 0.05 mol of N,N,N',N'-tetramethylethylenediamine (hereinafter, referred to as TMEDA) based on 1 mol of Bu-Li, and 0.05 mol of sodium t-pentoxide (hereinafter referred to as NaOAm) based on 1 mol of Bu-Li were added.

As a first step, a cyclohexane solution containing 8 parts by mass of styrene (concentration of 20% by mass) was placed over five minutes followed by polymerization for further 5 minutes. During polymerization, the temperature was controlled to 60° C.

Then, as a second step, a cyclohexane solution containing 85 parts by mass of butadiene (concentration of 20% by mass) were placed over 60 minutes. Thereafter, polymerization was carried out for further 5 minutes. During polymerization, the temperature was controlled to 55° C.

Then, as a third step, a cyclohexane solution containing 7 parts by mass of styrene (concentration of 20% by mass) was placed over five minutes followed by polymerization for further 5 minutes. During polymerization, the temperature was controlled to 60° C.

The obtained block copolymer had a styrene content of 15% by mass, a vinyl bond content before hydrogenation of the butadiene block portion of 78%, a weight average molecular weight of 178,000, and a molecular weight distribution of 1.12.

Subsequently, to the obtained block copolymer, the hydrogenated catalyst described above was added at 100 ppm in terms of titanium based on 100 parts by mass of the block copolymer, and hydrogenation reaction was carried out at a hydrogen pressure of 0.7 MPa and a temperature of 70° C.

Thereafter, methanol was added, and then, as a stabilizer, 0.3 parts by mass of octadecyl-3-(3,5-di-t-butyl-4-hydroxyphenyl)propionate was added to the block copolymer.

The obtained hydrogenated block copolymer (b1-1) had a degree of hydrogenation of 99.2% and a MFR of 4.8 g/10 min.

The analysis results of the obtained hydrogenated block copolymer (b1-1) are shown in Table 1.

(Hydrogenated Block Copolymer (b1-2))

Used was 0.095 parts by mass of Bu-Li based on 100 parts by mass of the whole monomers. As a first step, 12 parts by mass of styrene was placed over 10 minutes followed by polymerization for further five minutes. During polymerization, the temperature was controlled to 60° C.

Then, as a second step, 88 parts by mass of butadiene was placed over 60 minutes. Thereafter, polymerization was carried out for further 5 minutes. During polymerization, the temperature was controlled to 55° C. Then, 0.25 mol of dimethyldimethoxysilane was added based on 1 mol of Bu-Li to carry out coupling reaction. Thereafter, a hydrogenated block copolymer (b1-2) was produced by carrying out the same operation as for the aforementioned hydrogenated block copolymer (b1-1) except that the reactant was stirred at 60° C. for 10 minutes to prepare the block copolymer.

The obtained hydrogenated block copolymer (b1-2) had a styrene content of 12% by mass, a vinyl bond content of the butadiene block portion of 81%, a weight average molecular weight of 189,000, a coupling ratio of 55%, a degree of hydrogenation of 98.5%, and a MFR of 2.5 g/10 min.

The analysis results of the obtained hydrogenated block copolymer (b1-2) are shown in Table 1.

(Hydrogenated Block Copolymer (b1-3))

A hydrogenated block copolymer (b1-3) was produced by carrying out the same operation as for the hydrogenated block copolymer (b1-1) aforementioned except that 0.095 parts by mass of Bu-Li based on 100 parts by mass of the whole monomers was used, 0.65 mol of TMEDA was added based on 1 mol of Bu-Li, no NaOAm was added, the amount of styrene each in the first step and the third step was 9 parts by mass, the amount of butadiene in the second step was 82 parts by mass, and the temperature during polymerization was controlled to 67° C. to produce the block copolymer.

The obtained hydrogenated block copolymer (b1-3) had a styrene content of 18% by mass, a vinyl bond content of the butadiene block portion of 55%, a weight average molecular weight of 121,000, a molecular weight distribution of 1.05, a degree of hydrogenation of 99.0%, and a MFR of 4.0 g/10 min.

The analysis results of the obtained hydrogenated block copolymer (b1-3) are shown in Table 1.

(Hydrogenated Block Copolymer ((b2): b2-1)

A tank-type reactor having a capacity of 10 L equipped with a stirrer and a jacket was used to carry out batch polymerization.

First, 1 L of cyclohexane was provided. Then, 0.065 parts by mass of n-butyl lithium (hereinafter, referred to as Bu-Li) based on 100 parts by mass of the whole monomers, 1.5 mol of N,N,N',N'-tetramethylethylenediamine (hereinafter, referred to as TMEDA) based on 1 mol of Bu-Li, and 0.05 mol of sodium t-pentoxide (hereinafter referred to as NaOAm) based on 1 mol of Bu-Li were added.

As a first step, a cyclohexane solution containing 6.5 parts by mass of styrene (concentration 20% by mass) was placed over five minutes followed by polymerization for further 5 minutes. During polymerization, the temperature was controlled to 65° C.

Then, as a second step, a cyclohexane solution containing 82 parts by mass of butadiene (concentration of 20% by mass) were placed over 60 minutes. Thereafter, polymerization was carried out for further 5 minutes. During polymerization, the temperature was controlled to 55° C.

Then, as a third step, a cyclohexane solution containing 6.5 parts by mass of styrene (concentration 20% by mass) was placed over five minutes followed by polymerization for further 5 minutes.

Then, a fourth step was added, in which 5 parts by mass of butadiene was placed over five minutes followed by polymerization for further five minutes. During polymerization, the temperature was controlled to 65° C.

The obtained block copolymer had a styrene content of 13% by mass, a vinyl bond content of the butadiene block portion corresponding to the polymer block (B2) of 77%, a vinyl bond content of the butadiene block portion corresponding to the polymer block (B-2) of 76%, a weight average molecular weight of 174,000, and a molecular weight distribution of 1.09.

Subsequently, to the obtained block copolymer, the hydrogenated catalyst described above was added at 100 ppm in terms of titanium based on 100 parts by mass of the block copolymer, and hydrogenation reaction was carried out at a hydrogen pressure of 0.7 MPa and a temperature of 70° C.

Thereafter, methanol was added, and then, as a stabilizer, 0.3 parts by mass of octadecyl-3-(3,5-di-t-butyl-4-hydroxyphenyl)propionate was added to the block copolymer.

The obtained hydrogenated block copolymer (b2-1) had a degree of hydrogenation of 99.0% and a MFR of 5.0 g/10 min.

The analysis results of the obtained hydrogenated block copolymer (b2-1) are shown in Table 1.

(Hydrogenated Block Copolymer b3)

A polymer having the following structure was used as a hydrogenated block copolymer (b3) in the same manner as in Japanese Patent Laid-Open No. 9-327893:

styrene block content: 10% by mass, styrene/butadiene random copolymer block content: 90% by mass, styrene content in the random portion: 5% by mass, vinyl content in the random copolymer portion: 79 mol %, degree of hydrogenation: 99 mol %, and molecular weight Mw: 420,000.

[Polypropylene]

PP-1: Ethylene Propylene Random Copolymer

NOVATEC MF3FQ (manufactured by Japan Polypropylene Corporation, MFR: 8 g/10 min, ethylene content: 2.5 wt %)

PP-2: Ethylene Propylene Random Copolymer

NOVATEC EG6D (manufactured by Japan Polypropylene Corporation, MFR: 1.9 g/10 min, ethylene content: 1.3 wt %)

[Examples 1, 1-1, 2 to 17], [Comparative Examples 1 to 8]

(Method for Producing Film)

Layers shown in Tables 2 to 4 were each coextruded using materials shown in the tables so as to be layered in the order shown in Tables 2 to 4 (outer layer, intermediate layer, and inner layer) by means of a multilayer extruder (manufactured by Research Laboratory of Plastics Technology Co., Ltd., PLABOR) under conditions including an extrusion of 230° C. and a die temperature of 250° C. to thereby obtain a multi-layered film having a thickness of 0.25 mm.

[Examples 18 to 24], [Comparative Examples 9 to 15]

An outer layer, an intermediate layer, and an inner layer, which are of the same type, were coextruded by using materials shown in Table 6 by means of a multilayer extruder (manufactured by Research Laboratory of Plastics Technology Co., Ltd., PLABOR) under conditions including an extrusion of 230° C. and a die temperature of 250° C. to thereby obtain a single-layered film having a thickness of 0.20 mm.

The properties of the films and medical containers of Examples and Comparative Examples are shown in the following Table 2 to Table 6.

TABLE 2

| | | Example 1 | Example 1-1 | Example 2 | Example 3 | Example 4 | Example 5 | Example 6 | Example 7 | Comparative Example 1 |
|---|---|---|---|---|---|---|---|---|---|---|
| Outer layer | Polypropylene Type | PP-1 | PP-1 | PP-1 | PP-1 | PP-1 | PP-1 | PP-1 | PP-1 | PP-1 |
| | Content (wt %) | 100 | 100 | 100 | 100 | 100 | 100 | 100 | 100 | 100 |
| | Hydrogenated block copolymer Type | — | — | — | — | — | — | — | — | — |
| | Content (wt %) | — | — | — | — | — | — | — | — | — |
| | Thickness (μm) | 25 | 30 | 25 | 25 | 25 | 25 | 25 | 25 | 25 |
| Intermediate layer | Polypropylene Type | PP-1 | PP-1 | PP-1 | PP-1 | PP-1 | PP-1 | PP-1 | PP-1 | PP-1 |
| | Content | 60 | 70 | 60 | 60 | 60 | 60 | 60 | 60 | 60 |
| | Hydrogenated block copolymer Type | a-1 | a-1 | a-2 | a-3 | a-4 | a-5 | a-6 | a-7 | a-8 |
| | Content | 40 | 30 | 40 | 40 | 40 | 40 | 40 | 40 | 40 |
| | Thickness (μm) | 150 | 180 | 150 | 150 | 150 | 150 | 150 | 150 | 150 |
| Inner layer | Polypropylene Type | PP-1 | PP-1 | PP-1 | PP-1 | PP-1 | PP-1 | PP-1 | PP-1 | PP-1 |
| | Content | 70 | 100 | 70 | 70 | 70 | 70 | 70 | 70 | 70 |
| | Hydrogenated block copolymer Type | b1-3 | b1-3 | b1-3 | b1-3 | b1-3 | b1-3 | b1-3 | b1-3 | b1-3 |
| | Content | 30 | 10 | 30 | 30 | 30 | 30 | 30 | 30 | 30 |
| | Thickness (μm) | 25 | 30 | 25 | 25 | 25 | 25 | 25 | 25 | 25 |
| Film properties | Tensile modulus (MPa) | ◎ | ○ | ◎ | ○ | ○ | ◎ | ○ | ○ | ◎ |
| | Haze | ○ | ○ | ○ | ○ | ○ | ○ | ○ | ○ | ○ |
| | Heat sealability | ◎ | ○ | ◎ | ○ | ○ | ○ | ○ | ○ | ○ |
| | Water vapor permeability | 91 | 85 | 92 | 90 | 96 | 93 | 95 | 95 | 88 |
| Medical container property | Impact resistance | ◎ | ○ | ○ | ○ | ◎ | ○ | ○ | ◎ | Δ |
| CFC area % | −20° C.≥ | 3.9 | 5.2 | 3.9 | 3.9 | 3.9 | 4.0 | 3.9 | 4.0 | 4.0 |
| | −20–60° C. | 28.9 | 21.0 | 29.3 | 30.4 | 29.7 | 30.4 | 28.7 | 31.2 | 30.4 |
| | 60° C.≤ | 67.2 | 73.8 | 66.8 | 65.7 | 66.4 | 65.6 | 67.4 | 64.7 | 65.7 |
| CFC MOLECULAR WEIGHT DISTRIBUTION (Mw/Mn) | −20–60° C. | 1.24 | 1.26 | 1.24 | 1.32 | 1.38 | 1.41 | 1.30 | 1.23 | 1.25 |

TABLE 2-continued

| | | | Comparative Example 2 | Comparative Example 3 | Comparative Example 4 | Comparative Example 5 | Comparative Example 6 | Comparative Example 7 |
|---|---|---|---|---|---|---|---|---|
| Outer layer | Polypropylene | Type | PP-1 | PP-1 | PP-1 | PP-1 | PP-1 | PP-1 |
| | | Content (wt %) | 100 | 100 | 100 | 100 | 100 | 100 |
| | Hydrogenated block copolymer | Type | — | — | — | — | — | — |
| | | Content (wt %) | — | — | — | — | — | — |
| | Thickness (μm) | | 25 | 25 | 25 | 25 | 25 | 25 |
| Intermediate layer | Polypropylene | Type | PP-1 | PP-1 | PP-1 | PP-1 | PP-1 | PP-1 |
| | | Content | 60 | 60 | 60 | 60 | 60 | 60 |
| | Hydrogenated block copolymer | Type | a-9 | a-10 | b1-1 | a-11 | a-12 | a-13 |
| | | Content | 40 | 40 | 40 | 40 | 40 | 40 |
| | Thickness (μm) | | 150 | 150 | 150 | 150 | 150 | 150 |
| Inner layer | Polypropylene | Type | PP-1 | PP-1 | PP-1 | PP-1 | PP-1 | PP-1 |
| | | Content | 70 | 70 | 70 | 70 | 70 | 70 |
| | Hydrogenated block copolymer | Type | b1-3 | b1-3 | b1-3 | b1-3 | b1-3 | b1-3 |
| | | Content | 30 | 30 | 30 | 30 | 30 | 30 |
| | Thickness (μm) | | 25 | 25 | 25 | 25 | 25 | 25 |
| Film properties | Tensile modulus (MPa) | | △ | △ | ⊚ | ⊚ | ⊚ | X |
| | Haze | | △ | ○ | ○ | ○ | △ | △ |
| | Heat sealability | | △ | X | ⊚ | △ | ○ | △ |
| | Water vapor permeability | | 99 | 87 | 100 | 93 | 110 | 95 |
| Medical container property | Impact resistance | | △ | X | X | △ | ○ | ○ |
| CFC area % | | −20° C.≥ | 4.0 | 3.9 | 34.9 | 4.0 | 3.9 | 4.0 |
| | | −20–60° C. | 30.4 | 28.9 | 0.0 | 29.7 | 28.6 | 30.6 |
| | | 60° C.≤ | 65.6 | 67.2 | 65.1 | 66.3 | 67.4 | 65.4 |
| CFC MOLECULAR WEIGHT DISTRIBUTION (Mw/Mn) | | −20–60° C. | 1.29 | 1.31 | — | 1.29 | 1.27 | 1.19 |

TABLE 3

|  |  |  | Example 8 | Example 9 | Example 10 | Example 11 |
|---|---|---|---|---|---|---|
| Outer layer | Polypropylene | Type | PP-2 | PP-2 | PP-2 | PP-2 |
|  |  | Content (wt %) | 80 | 80 | 80 | 80 |
|  | Hydrogenated block copolymer | Type | b1-1 | b2-1 | b1-2 | b1-1 |
|  |  | Content (wt %) | 20 | 20 | 20 | 20 |
|  | Thickness (μm) |  | 25 | 25 | 25 | 25 |
| Intermediate layer | Polypropylene | Type | PP-2 | PP-2 | PP-2 | PP-2 |
|  |  | Content | 60 | 60 | 60 | 60 |
|  | Hydrogenated block copolymer | Type | a-1 | a-1 | a-1 | a-2 |
|  |  | Content | 40 | 40 | 40 | 40 |
|  | Thickness (μm) |  | 150 | 150 | 150 | 150 |
| Inner layer | Polypropylene | Type | PP-2 | PP-2 | PP-1 | PP-2 |
|  |  | Content | 70 | 70 | 70 | 70 |
|  | Hydrogenated block copolymer | Type | b1-3 | b1-3 | b1-3 | b1-3 |
|  |  | Content | 30 | 30 | 30 | 30 |
|  | Thickness (μm) |  | 25 | 25 | 25 | 25 |
| Film properties | Tensile modulus (MPa) |  | ◉ | ◉ | ◉ | ◉ |
|  | Haze |  | ○ | ○ | ○ | ○ |
|  | Heat sealability |  | ○ | ◉ | ◉ | ○ |
|  | Water vapor permeability |  | 95 | 98 | 96 | 96 |
| Medical container property | Impact resistance |  | ○ | ○ | ○ | ○ |
| CFC area % |  | −20° C.≥ | 6.5 | 4.0 | 4.0 | 4.0 |
|  |  | −20~60° C. | 28.9 | 30.1 | 31.2 | 30.5 |
|  |  | 60° C.≤ | 64.7 | 65.9 | 64.8 | 65.5 |
| CFC MOLECULAR WEIGHT DISTRIBUTION (Mw/Mn) |  | −20~60° C. | 1.22 | 1.23 | 1.25 | 1.26 |

TABLE 4

|  |  |  | Example 12 | Example 13 | Example 14 | Example 15 | Example 16 | Example 17 |
|---|---|---|---|---|---|---|---|---|
| Outer layer | Polypropylene | Type | PP-2 | PP-2 | PP-2 | PP-2 | PP-1 | PP-1 |
|  |  | Content (wt %) | 80 | 80 | 80 | 80 | 80 | 100 |
|  | Hydrogenated block copolymer | Type | b2-1 | b2-1 | b2-1 | b2-1 | a-1 | — |
|  |  | Content (wt %) | 20 | 20 | 15 | 15 | 20 | — |
|  |  | Type | — | — | b1-3 | b1-3 | — | — |
|  |  | Content (wt %) | — | — | 5 | 5 | — | — |
|  | Thickness (μm) |  | 25 | 25 | 25 | 25 | — | — |
| Intermediate layer | Polypropylene | Type | PP-2 | PP-2 | PP-2 | PP-2 | PP-1 | PP-1 |
|  |  | Content | 60 | 60 | 60 | 6- | 60 | 60 |
|  | Hydrogenated block copolymer | Type | a-1 | a-1 | a-1 | a-1 | a-4 | a-4 |
|  |  | Content | 40 | 40 | 40 | 40 | 40 | 40 |
|  | Thickness (μm) |  | 140 | 140 | 140 | 140 | 150 | 150 |
| Inner layer | Polypropylene | Type | PP-2 | PP-2 | PP-2 | PP-2 | PP-1 | PP-1 |
|  |  | Content | 70 | 70 | 70 | 70 | 70 | 70 |
|  | Hydrogenated block copolymer | Type | b2-1 | b2-1 | b2-1 | b2-1 | b1-3 | a-1 |
|  |  | Content | 30 | 20 | 30 | 20 | 30 | 15 |
|  |  | Type | — | b1-3 | — | b1-3 | — | b1-3 |
|  |  | Content | — | 10 | — | 10 | — | 15 |
|  | Thickness (μm) |  | 35 | 35 | 35 | 35 | 25 | 25 |
| Film properties | Tensile modulus (MPa) |  | ◉ | ○ | ○ | ○ | ◉ | ◉ |
|  | Haze |  | ○ | ○ | ○ | ○ | ○ | ○ |
|  | Heat sealability |  | ○ | ◉ | ○ | ○ | ○ | ○ |
|  | Water vapor permeability |  | 97 | 94 | 95 | 93 | 98 | 97 |
| Medical container property | Impact resistance |  | ○ | ◉ | ○ | ◉ | ○ | ○ |
| CFC area % |  | −20° C.≥ | 5.7 | 5.6 | 5.8 | 5.7 | 4.1 | 3.9 |
|  |  | −20~60° C. | 29.0 | 27.4 | 29.9 | 29.1 | 31.1 | 28.9 |
|  |  | 60° C.≤ | 65.2 | 67.0 | 64.3 | 65.3 | 64.7 | 67.2 |
| CFC MOLECULAR WEIGHT DISTRIBUTION (Mw/Mn) |  | −20~60° C. | 1.21 | 1.23 | 1.23 | 1.26 | 1.35 | 1.37 |

TABLE 5

|  |  |  | Comparative Example 8 |
|---|---|---|---|
| Outer layer | Polypropylene | Type | PP-2 |
|  |  | Content (wt %) | 80 |
|  | Hydrogenated block copolymer | Type | a-7 |
|  |  | Content (wt %) | 20 |
|  |  | Type | — |
|  |  | Content (wt %) | — |
|  |  | Thickness (μm) | 25 |
| Intermediate layer | Polypropylene | Type | PP-2 |
|  |  | Content | 60 |
|  | Hydrogenated block copolymer | Type | b-3 |
|  |  | Content | 40 |
|  |  | Thickness (μm) | 140 |
| Inner layer | Polypropylene | Type | PP-2 |
|  |  | Content | 70 |
|  | Hydrogenated block copolymer | Type | b2-1 |
|  |  | Content | 30 |
|  |  | Type | — |
|  |  | Content | — |
|  |  | Thickness (μm) | 35 |
| Film properties | Tensile modulus (MPa) |  | ○ |
|  | Haze |  | Δ |
|  | Heat sealability |  | ○ |
|  | Water vapor permeability |  | 99 |
| Medical container property | Impact resistance |  | X |
| CFC area % | −20° C.≥ |  | 33.7 |
|  | −20~60° C. |  | 2.4 |
|  | 60° C.≤ |  | 63.9 |
| CFC MOLECULAR WEIGHT DISTRIBUTION (Mw/Mn) | −20~60° C. |  | 1.43 |

TABLE 6

| | | Example 18 | Example 19 | Example 20 | Example 21 | Example 22 | Example 23 | Example 24 | Comparative Example 9 |
|---|---|---|---|---|---|---|---|---|---|
| Intermediate layer | Polypropylene Type | PP-1 | PP-1 | PP-1 | PP-1 | PP-1 | PP-1 | PP-1 | PP-1 |
| | Content | 70 | 70 | 70 | 70 | 70 | 70 | 70 | 70 |
| | Hydrogenated block copolymer Type | a-1 | a-2 | a-3 | a-4 | a-5 | a-6 | a-7 | a-8 |
| | Content | 30 | 30 | 30 | 30 | 30 | 30 | 30 | 30 |
| | Thickness (μm) | 200 | 200 | 200 | 200 | 200 | 200 | 200 | 200 |
| Film properties | Tensile modulus (MPa) | ⊚ | ⊚ | ○ | ○ | ⊚ | ○ | ○ | ⊚ |
| | Haze | ○ | ⊚ | ○ | ○ | ○ | ○ | ○ | ○ |
| | Heat sealability | ○ | ○ | ○ | ○ | ○ | ○ | ○ | ○ |
| | Water vapor permeability | 75 | 76 | 75 | 79 | 77 | 79 | 79 | 73 |
| Medical container property | Impact resistance | ⊚ | ○ | ○ | ⊚ | ○ | ○ | ⊚ | △ |
| CFC area % | −20° C. ≥ | 2.9 | 4.9 | 3.0 | 5.3 | 6.2 | 6.0 | 2.2 | 6.3 |
| | −20–60° C. | 28.5 | 27.9 | 29.1 | 28.2 | 27.3 | 28.2 | 28.5 | 27.9 |
| | 60° C. ≤ | 68.6 | 67.2 | 67.9 | 66.5 | 66.5 | 65.8 | 69.3 | 65.8 |
| CFC MOLECULAR WEIGHT DISTRIBUTION (Mw/Mn) | −20–60° C. | 1.21 | 1.26 | 1.33 | 1.36 | 1.39 | 1.32 | 1.22 | 1.27 |

| | | Comparative Example 10 | Comparative Example 11 | Comparative Example 12 | Comparative Example 13 | Comparative Example 14 | Comparative Example 15 |
|---|---|---|---|---|---|---|---|
| Intermediate layer | Polypropylene Type | PP-1 | PP-1 | PP-1 | PP-1 | PP-1 | PP-1 |
| | Content | 70 | 70 | 70 | 70 | 70 | 70 |
| | Hydrogenated block copolymer Type | a-9 | a-10 | b1-1 | a-11 | a-12 | a-13 |
| | Content | 30 | 30 | 30 | 30 | 30 | 30 |
| | Thickness (μm) | 200 | 200 | 200 | 200 | 200 | 200 |
| Film properties | Tensile modulus (MPa) | △ | △ | ⊚ | ⊚ | ⊚ | × |
| | Haze | △ | × | ○ | ○ | △ | △ |
| | Heat sealability | ○ | ○ | ⊚ | △ | ○ | △ |
| | Water vapor permeability | 82 | 72 | 83 | 77 | 91 | 79 |
| Medical container property | Impact resistance | △ | × | × | △ | ○ | ○ |
| CFC area % | −20° C. ≥ | 5.5 | 6.8 | 31.4 | 3.2 | 4.8 | 4.8 |
| | −20–60° C. | 29.4 | 28.8 | 0.0 | 29.2 | 28.4 | 29.1 |
| | 60° C. ≤ | 65.1 | 64.4 | 68.6 | 67.6 | 66.9 | 66.2 |
| CFC MOLECULAR WEIGHT DISTRIBUTION (Mw/Mn) | −20–60° C. | 1.26 | 1.32 | — | 1.26 | 1.30 | 1.22 |

This application is based on Japanese Patent Application No. 2015-177932 filed with the Japan Patent Office on Sep. 9, 2015, the contents of which is incorporated herein by reference.

INDUSTRIAL APPLICABILITY

The film of the present embodiment has industrial applicability for various apparel packaging, various food packaging, daily necessaries packaging, industrial material packaging, various rubber products, resin products, laminates for leather products and the like, stretch tape for paper diapers and the like, industrial products such as dicing films, protect films used for construction materials and steel sheets, base materials for adhesive films, meat and fish trays, fruit and vegetables packs, sheet products such as frozen food containers, home electronics applications such as televisions, stereos, and vacuum cleaners, automobile interior and exterior parts applications such as bumper parts, body panels, and side seals, road-paving materials, waterproof and impervious sheets, civil engineering packings, commodities, leisure goods, toys, industrial products, furniture products, stationery such as writing instruments, clear pockets, holders, and file spines, and medical products such as infusion bags. Particularly, the film can be suitably used as medical films and packaging materials, for example, food packaging materials, apparel packaging materials and the like.

The invention claimed is:

1. A film comprising at least an outer layer, an intermediate layer, and an inner layer, wherein
the outer layer comprises a polypropylene resin,
the intermediate layer comprises a polypropylene resin and a hydrogenated block copolymer (a), and
the inner layer comprises a polypropylene resin, and wherein
a content of the vinyl aromatic compound monomer unit in the hydrogenated block copolymer (a) is 3 to 13% by mass,
the hydrogenated block copolymer (a) has a degree of hydrogenation of 90 mol %,
an amount of butylene and/or amount of propylene in the hydrogenated block copolymer (a) is 60 to 85 mol % based on 100 mol % of the conjugated diene compound unit in total,
the hydrogenated block copolymer (a) has a crystallization peak at 0 to 60° C.,
the hydrogenated block copolymer (a) has a heat quantity of crystallization of 1.0 to 8.0 J/g, and
the hydrogenated block copolymer (a) has a Shore A hardness of 25 to 55.

2. The film according to claim 1, wherein the outer layer has a thickness of 5 to 50 μm, the intermediate layer has a thickness of 100 to 200 μm, and the inner layer has a thickness of 5 to 50 μm.

3. The film according to claim 1, wherein
the outer layer comprises the hydrogenated block copolymer (a) and/or a hydrogenated block copolymer (b1) (provided that the block copolymer (b1) does not comprise the polymer block mainly comprising a conjugated diene compound (C)),
the hydrogenated block copolymer (b1) comprises a polymer block mainly comprising a conjugated diene compound (B1) and a polymer block mainly comprising a vinyl aromatic compound (S1),
a content of the polymer block mainly comprising a conjugated diene compound (B1) is 75 to 92% by mass, and a content of the polymer block mainly comprising a vinyl aromatic compound (S1) is 8 to 25% by mass in the hydrogenated block copolymer (b1),
a vinyl bond content before hydrogenation of the polymer block mainly comprising a conjugated diene compound (B1) is 40 to 100 mol %, and the hydrogenated block copolymer (b1) has a degree of hydrogenation of 80 mol % or more,
a content of the polypropylene resin in the outer layer is 60 to 100% by mass, and
a content of the hydrogenated block copolymer (a) and/or hydrogenated block copolymer (b1) in the outer layer is 0 to 40% by mass.

4. The film according to claim 1, wherein
the inner layer comprises the hydrogenated block copolymer (a) and/or the hydrogenated block copolymer (b1) (provided that the block copolymer (b1) does not comprise the polymer block mainly comprising a conjugated diene compound (C)),
the hydrogenated block copolymer (b1) comprises a polymer block mainly comprising a conjugated diene compound (B1) and a polymer block mainly comprising a vinyl aromatic compound (S1),
a content of the polymer block mainly comprising a conjugated diene compound (B1) is 75 to 92% by mass and a content of the polymer block mainly comprising a vinyl aromatic compound (S1) is 8 to 25% by mass in the hydrogenated block copolymer (b1),
a vinyl bond content before hydrogenation of the polymer block mainly comprising a conjugated diene compound (B1) is 40 to 100 mol %, and the hydrogenated block copolymer (b1) has a degree of hydrogenation of 80 mol % or more,
a content of the polypropylene resin in the inner layer is 50 to 95% by mass, and
a content of the hydrogenated block copolymer (a) and/or hydrogenated block copolymer (b1) in the inner layer is 5 to 50% by mass.

5. The film according to claim 1, wherein the hydrogenated block copolymer (a) comprises two or more of the polymer blocks mainly comprising a conjugated diene compound (B) in a molecule, and a content of a polymer block (B-1) present at a terminal of the hydrogenated block copolymer (a) of the polymer blocks mainly comprising a conjugated diene compound (B) is 1 to 10% by mass in the hydrogenated block copolymer (a).

6. The film according to claim 1, wherein
the outer layer further comprises a hydrogenated block copolymer (b2),
the hydrogenated block copolymer (b2) comprises a polymer block mainly comprising a conjugated diene compound (B2) and a polymer block mainly comprising a vinyl aromatic compound (S2),
a content of the polymer block mainly comprising a conjugated diene compound (B2) is 75 to 92% by mass and a content of the polymer block mainly comprising a vinyl aromatic compound (S2) be 8 to 25% by mass in the hydrogenated block copolymer (b2),
a vinyl bond content before hydrogenation of the polymer block mainly comprising a conjugated diene compound (B2) is 62 to 100 mol %, and the hydrogenated block copolymer (b2) has a degree of hydrogenation of 80 mol % or more, and
the hydrogenated block copolymer (b2) comprises
two or more of the polymer blocks mainly comprising a conjugated diene compound (B2) in a molecule, and a content of a polymer block (B-2) present at a terminal of the hydrogenated block copolymer (b2) of the polymer block mainly comprising a conjugated diene compound (B2) is 1 to 10% by mass in the hydrogenated block copolymer.

7. The film according to claim 1, wherein
the inner layer further comprises a hydrogenated block copolymer (b2),
the hydrogenated block copolymer (b2) comprises a polymer block mainly comprising a conjugated diene compound (B2) and a polymer block mainly comprising a vinyl aromatic compound (S2),
a content of the polymer block mainly comprising a conjugated diene compound (B2) is 75 to 92% by mass, and a content of the polymer block mainly comprising a vinyl aromatic compound (S2) is 8 to 25% by mass in the hydrogenated block copolymer (b2),
a vinyl bond content before hydrogenation of the polymer block mainly comprising a conjugated diene compound (B2) is 62 to 100 mol %, and the hydrogenated block copolymer (b2) has a degree of hydrogenation of 80 mol % or more, and
the hydrogenated block copolymer (b2) comprises
two or more of the polymer blocks mainly comprising a conjugated diene compound (B2) in a molecule, and a content of a polymer block (B-2) present at a terminal of the hydrogenated block copolymer (b2) of the polymer block mainly comprising a conjugated diene compound (B2) is 1 to 10% by mass in the hydrogenated block copolymer.

8. The film according to claim 1, wherein the hydrogenated block copolymer (a) has a weight average molecular weight (Mw) of 100,000 to 300,000.

9. The film according to claim 1, wherein the hydrogenated block copolymer (a) has a weight average molecular weight (Mw) of 100,000 to 300,000, and a ratio of a weight average molecular weight (Mw) to a number average molecule weight (Mn) of the hydrogenated block copolymer (a), (Mw)/(Mn), is 1.01 to 1.30.

10. The film according to claim 1, wherein an integrated amount of elution at −20° C. or less measured by cross-fractionation chromatography (CFC) is 0.1% or more and less than 40% based on the total integrated amount of elution, an integrated amount of elution in the range of more than −20° C. and less than 60° C. is 20% or more and less than 95% based on the total integrated amount of elution, and an integrated amount of elution in the range of 60° C. or more and 150° C. or less is 5% or more and less than 70% based on the total integrated amount of elution.

11. The film according to claim 1, wherein the molecular weight distribution (Mw/Mn) of an eluted component in the range of 10° C. or more and less than 60° C. measured by cross-fractionation chromatography (CFC) is 1.05 or more and 1.50 or less.

* * * * *